(12) United States Patent
Westerhoff et al.

(10) Patent No.: US 11,315,210 B2
(45) Date of Patent: Apr. 26, 2022

(54) MULTI-USER MULTI-GPU RENDER SERVER APPARATUS AND METHODS

(71) Applicant: PME IP PTY LTD, Richmond (AU)

(72) Inventors: Malte Westerhoff, Berlin (DE); Detlev Stalling, Berlin (DE)

(73) Assignee: PME IP PTY LTD, Richmond (AU)

( * ) Notice: Subject to any disclaimer, the term of this patent is extended or adjusted under 35 U.S.C. 154(b) by 0 days.

(21) Appl. No.: 16/986,677

(22) Filed: Aug. 6, 2020

(65) Prior Publication Data

US 2020/0364824 A1 Nov. 19, 2020

Related U.S. Application Data

(63) Continuation of application No. 16/403,233, filed on May 3, 2019, now Pat. No. 10,825,126, which is a
(Continued)

(51) Int. Cl.
| | |
|---|---|
| *G06T 1/20* | (2006.01) |
| *G06T 1/60* | (2006.01) |
| *G06T 15/00* | (2011.01) |

(52) U.S. Cl.
CPC .................. *G06T 1/20* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | |
|---|---|---|
| 2,658,310 A | 11/1953 | Cook |
| 3,431,200 A | 3/1969 | Davis |
| (Continued) | | |

FOREIGN PATENT DOCUMENTS

| | | |
|---|---|---|
| DE | 10317384 | 4/2004 |
| EP | 0492897 | 7/1992 |
| (Continued) | | |

OTHER PUBLICATIONS

ATI Website Index, http://www.ati.com/developer/index.html, Dec. 20, 2002, 2 pages.
(Continued)

*Primary Examiner* — Tize Ma
(74) *Attorney, Agent, or Firm* — Sci-Law Strategies PC

(57) ABSTRACT

The invention provides, in some aspects, a system for rendering images, the system having one or more client digital data processors and a server digital data processor in communications coupling with the one or more client digital data processors, the server digital data processor having one or more graphics processing units. The system additionally comprises a render server module executing on the server digital data processor and in communications coupling with the graphics processing units, where the render server module issues a command in response to a request from a first client digital data processor. The graphics processing units on the server digital data processor simultaneously process image data in response to interleaved commands from (i) the render server module on behalf of the first client digital data processor, and (ii) one or more requests from (a) the render server module on behalf of any of the other client digital data processors, and (b) other functionality on the server digital data processor.

19 Claims, 15 Drawing Sheets

Related U.S. Application Data continuation of application No. 15/640,294, filed on Jun. 30, 2017, now Pat. No. 10,311,541, which is a continuation of application No. 14/641,248, filed on Mar. 6, 2015, now Pat. No. 9,728,165, which is a continuation of application No. 13/684,464, filed on Nov. 23, 2012, now Pat. No. 9,355,616, which is a continuation of application No. 12/275,421, filed on Nov. 21, 2008, now Pat. No. 8,319,781.

(60) Provisional application No. 60/989,881, filed on Nov. 23, 2007.

(56) References Cited

U.S. PATENT DOCUMENTS

| | | |
|---|---|---|
| 3,645,040 A | 2/1972 | Ort |
| 4,137,868 A | 2/1979 | Pryor |
| 4,235,043 A | 11/1980 | Harasawa et al. |
| 4,258,661 A | 3/1981 | Margen |
| 4,267,038 A | 5/1981 | Thompson |
| 4,320,594 A | 3/1982 | Raymond |
| 4,746,795 A | 5/1988 | Stewart et al. |
| 4,905,148 A | 2/1990 | Crawford |
| 4,910,912 A | 3/1990 | Lowrey, III |
| 4,928,250 A | 5/1990 | Greenberg et al. |
| 4,958,460 A | 9/1990 | Nielson et al. |
| 4,984,160 A | 1/1991 | Saint Felix et al. |
| 5,031,117 A | 7/1991 | Minor et al. |
| 5,091,960 A | 2/1992 | Butler |
| 5,121,708 A | 6/1992 | Nuttle |
| 5,128,864 A | 7/1992 | Waggener et al. |
| 5,218,534 A | 6/1993 | Trousset et al. |
| 5,235,510 A | 8/1993 | Yamada |
| 5,241,471 A | 8/1993 | Trousset et al. |
| 5,253,171 A | 10/1993 | Hsiao et al. |
| 5,274,759 A | 12/1993 | Yoshioka |
| 5,280,428 A | 1/1994 | Wu et al. |
| 5,287,274 A | 2/1994 | Saint Felix et al. |
| 5,293,313 A | 3/1994 | Cecil |
| 5,307,264 A | 4/1994 | Waggener et al. |
| 5,355,453 A | 10/1994 | Row et al. |
| 5,368,033 A | 11/1994 | Moshfeghi |
| 5,375,156 A | 12/1994 | Kuo-Petravic et al. |
| 5,412,703 A | 5/1995 | Goodenough et al. |
| 5,412,764 A | 5/1995 | Tanaka |
| 5,442,672 A | 8/1995 | Bjorkholm et al. |
| 5,452,416 A | 9/1995 | Hilton |
| 5,488,700 A | 1/1996 | Glassner |
| 5,560,360 A | 10/1996 | Filler |
| 5,594,842 A | 1/1997 | Kaufman et al. |
| 5,602,892 A | 2/1997 | Llacer |
| 5,633,951 A | 5/1997 | Moshfeghi |
| 5,633,999 A | 5/1997 | Clowes et al. |
| 5,640,436 A | 6/1997 | Kawai et al. |
| 5,671,265 A | 9/1997 | Andress |
| 5,744,802 A | 4/1998 | Muehllehner et al. |
| 5,774,519 A | 6/1998 | Lindstrom et al. |
| 5,790,787 A | 8/1998 | Scott et al. |
| 5,793,374 A | 8/1998 | Guenter et al. |
| 5,793,879 A | 8/1998 | Benn et al. |
| 5,813,988 A | 9/1998 | Alfano et al. |
| 5,821,541 A | 10/1998 | Tumer |
| 5,825,842 A | 10/1998 | Taguchi |
| 5,838,756 A | 11/1998 | Taguchi et al. |
| 5,841,140 A | 11/1998 | Mc Croskey et al. |
| 5,909,476 A | 6/1999 | Cheng et al. |
| 5,930,384 A | 7/1999 | Guillemaud et al. |
| 5,931,789 A | 8/1999 | Alfano et al. |
| 5,950,203 A | 9/1999 | Stakuis |
| 5,960,056 A | 9/1999 | Lai |
| 5,963,612 A | 10/1999 | Navab |
| 5,963,613 A | 10/1999 | Navab |
| 5,963,658 A | 10/1999 | Klibanov et al. |
| 6,002,739 A | 12/1999 | Heumann |
| 6,018,562 A | 1/2000 | Willson |
| 6,032,264 A | 2/2000 | Beffa et al. |
| 6,044,132 A | 3/2000 | Navab |
| 6,049,390 A | 4/2000 | Notredame |
| 6,049,582 A | 4/2000 | Navab |
| 6,072,177 A | 6/2000 | Mccroskey et al. |
| 6,088,423 A | 7/2000 | Krug et al. |
| 6,091,422 A | 7/2000 | Ouaknine et al. |
| 6,104,827 A | 8/2000 | Benn et al. |
| 6,105,029 A | 8/2000 | Maddalozzo, Jr. et al. |
| 6,108,007 A | 8/2000 | Shochet |
| 6,108,576 A | 8/2000 | Alfano et al. |
| 6,123,733 A | 9/2000 | Dalton |
| 6,175,655 B1 | 1/2001 | George |
| 6,205,120 B1 | 3/2001 | Packer et al. |
| 6,219,061 B1 | 4/2001 | Lauer et al. |
| 6,226,005 B1 | 5/2001 | Laferriere |
| 6,236,704 B1 | 5/2001 | Navab et al. |
| 6,243,098 B1 | 6/2001 | Lauer et al. |
| 6,249,594 B1 | 6/2001 | Hibbard |
| 6,255,655 B1 | 7/2001 | Mc Croskey et al. |
| 6,264,610 B1 | 7/2001 | Zhu |
| 6,268,846 B1 | 7/2001 | Georgiev |
| 6,278,460 B1 | 8/2001 | Myers et al. |
| 6,282,256 B1 | 8/2001 | Grass et al. |
| 6,289,235 B1 | 9/2001 | Webber et al. |
| 6,304,771 B1 | 10/2001 | Yodh et al. |
| 6,320,928 B1 | 11/2001 | Vaillant et al. |
| 6,324,241 B1 | 11/2001 | Besson |
| 6,377,257 B1 | 4/2002 | Borrel |
| 6,377,266 B1 | 4/2002 | Baldwin |
| 6,384,821 B1 | 5/2002 | Borrel |
| 6,404,843 B1 | 6/2002 | Vaillant |
| 6,415,013 B1 | 7/2002 | Hsieh et al. |
| 6,470,067 B1 | 10/2002 | Harding |
| 6,470,070 B2 | 10/2002 | Menhardt |
| 6,473,793 B1 | 10/2002 | Dillon et al. |
| 6,475,150 B2 | 11/2002 | Haddad |
| 6,507,633 B1 | 1/2003 | Elbakri et al. |
| 6,510,241 B1 | 1/2003 | Vaillant et al. |
| 6,519,355 B2 | 2/2003 | Nelson |
| 6,526,305 B1 | 2/2003 | Mori |
| 6,557,102 B1 | 4/2003 | Wong et al. |
| 6,559,958 B2 | 5/2003 | Motamed |
| 6,591,004 B1 | 7/2003 | VanEssen et al. |
| 6,615,063 B1 | 9/2003 | Ntziachristos et al. |
| 6,633,688 B1 | 10/2003 | Nixon |
| 6,636,623 B2 | 10/2003 | Nelson et al. |
| 6,654,012 B1 | 11/2003 | Lauer et al. |
| 6,658,142 B1 | 12/2003 | Kam et al. |
| 6,664,963 B1 | 12/2003 | Zatz |
| 6,674,430 B1 | 1/2004 | Kaufman et al. |
| 6,697,508 B2 | 2/2004 | Nelson |
| 6,707,878 B2 | 3/2004 | Claus et al. |
| 6,718,195 B2 | 4/2004 | Van Der Mark et al. |
| 6,731,283 B1 | 5/2004 | Navab |
| 6,740,232 B1 | 5/2004 | Beaulieu |
| 6,741,730 B2 | 5/2004 | Rahn et al. |
| 6,744,253 B2 | 6/2004 | Stolarczyk |
| 6,744,845 B2 | 6/2004 | Harding et al. |
| 6,745,070 B2 | 6/2004 | Wexler et al. |
| 6,747,654 B1 | 6/2004 | Laksono et al. |
| 6,754,299 B2 | 6/2004 | Patch |
| 6,765,981 B2 | 7/2004 | Heumann |
| 6,768,782 B1 | 7/2004 | Hsieh et al. |
| 6,770,893 B2 | 8/2004 | Nelson |
| 6,771,733 B2 | 8/2004 | Katsevich |
| 6,778,127 B2 | 8/2004 | Stolarczyk et al. |
| 6,785,409 B1 | 8/2004 | Suri |
| 6,798,417 B1 | 9/2004 | Taylor |
| 6,807,581 B1 | 10/2004 | Starr et al. |
| 6,825,840 B2 | 11/2004 | Gritz |
| 6,825,843 B2 | 11/2004 | Allen et al. |
| 6,923,906 B2 | 8/2005 | Oswald et al. |
| 6,947,047 B1 | 9/2005 | Moy et al. |
| 6,978,206 B1 | 12/2005 | Pu |
| 7,003,547 B1 | 2/2006 | Hubbard |
| 7,006,101 B1 | 2/2006 | Brown et al. |
| 7,031,022 B1 | 4/2006 | Komori et al. |

(56) References Cited

U.S. PATENT DOCUMENTS

| | | |
|---|---|---|
| 7,034,828 B1 | 4/2006 | Drebin et al. |
| 7,039,723 B2 | 5/2006 | Hu |
| 7,050,953 B2 | 5/2006 | Chiang et al. |
| 7,054,852 B1 | 5/2006 | Cohen |
| 7,058,644 B2 | 6/2006 | Patchet et al. |
| 7,076,735 B2 | 7/2006 | Callegari |
| 7,098,907 B2 | 8/2006 | Houston et al. |
| 7,120,283 B2 | 10/2006 | Thieret |
| 7,133,041 B2 | 11/2006 | Kaufman et al. |
| 7,154,985 B2 | 12/2006 | Dobbs |
| 7,167,176 B2 | 1/2007 | Sloan et al. |
| 7,184,041 B2 | 2/2007 | Heng et al. |
| 7,185,003 B2 | 2/2007 | Bayliss et al. |
| 7,219,085 B2 | 5/2007 | Buck et al. |
| 7,242,401 B2 | 7/2007 | Yang et al. |
| 7,262,770 B2 | 8/2007 | Sloan et al. |
| 7,274,368 B1 | 9/2007 | Keslin |
| 7,299,232 B2 | 11/2007 | Stakutis et al. |
| 7,315,926 B2 | 1/2008 | Fridella et al. |
| 7,324,116 B2 | 1/2008 | Boyd et al. |
| 7,339,585 B2 | 3/2008 | Verstraelen et al. |
| 7,472,156 B2 | 12/2008 | Philbrick et al. |
| 7,502,869 B2 | 3/2009 | Boucher et al. |
| 7,506,375 B2 | 3/2009 | Kanda et al. |
| 7,552,192 B2 | 6/2009 | Carmichael |
| 7,609,884 B1 | 10/2009 | Stalling |
| 7,693,318 B1 | 4/2010 | Stalling |
| 7,701,210 B2 | 4/2010 | Ichinose |
| 7,778,392 B1 | 8/2010 | Bergman |
| 7,876,944 B2 | 1/2011 | Stalling |
| 7,889,895 B2 | 2/2011 | Nowinski |
| 7,899,516 B2 | 3/2011 | Chen et al. |
| 7,907,759 B2 | 3/2011 | Hundley |
| 7,956,612 B2 | 6/2011 | Sorensen |
| 7,983,300 B2 | 7/2011 | Vaughan et al. |
| 7,991,837 B1 | 8/2011 | Tahan |
| 7,995,824 B2 | 8/2011 | Yim |
| 8,107,592 B2 | 1/2012 | Bergman |
| 8,189,002 B1 | 5/2012 | Westerhoff |
| 8,319,781 B2 | 11/2012 | Westerhoff |
| 8,369,600 B2 | 2/2013 | Can et al. |
| 8,386,560 B2 | 2/2013 | Ma |
| 8,392,529 B2 | 3/2013 | Westerhoff |
| 8,508,539 B2 | 8/2013 | Vlietinck |
| 8,538,108 B2 | 9/2013 | Shekhar |
| 8,542,136 B1 | 9/2013 | Owsley et al. |
| 8,548,215 B2 | 10/2013 | Westerhoff |
| 8,775,510 B2 | 7/2014 | Westerhoff |
| 8,976,190 B1 | 3/2015 | Westerhoff |
| 9,019,287 B2 | 4/2015 | Westerhoff |
| 9,167,027 B2 | 10/2015 | Westerhoff |
| 9,299,156 B2 | 3/2016 | Zalis |
| 9,355,616 B2 | 5/2016 | Westerhoff |
| 9,454,813 B2 | 9/2016 | Westerhoff |
| 9,509,802 B1 | 11/2016 | Westerhoff |
| 9,524,577 B1 | 12/2016 | Westerhoff |
| 9,531,789 B2 | 12/2016 | Westerhoff |
| 9,595,242 B1 | 3/2017 | Westerhoff |
| 9,728,165 B1 | 8/2017 | Westerhoff |
| 9,749,245 B2 | 8/2017 | Stalling |
| 9,860,300 B2 | 1/2018 | Westerhoff |
| 9,898,855 B2 | 2/2018 | Westerhoff |
| 9,904,969 B1 | 2/2018 | Westerhoff |
| 9,984,460 B2 | 5/2018 | Westerhoff |
| 9,984,478 B2 | 5/2018 | Westerhoff |
| 10,038,739 B2 | 7/2018 | Westerhoff |
| 10,043,482 B2 | 8/2018 | Westerhoff |
| 10,070,839 B2 | 9/2018 | Westerhoff |
| 10,311,541 B2 | 6/2019 | Westerhoff |
| 10,320,684 B2 | 6/2019 | Stalling |
| 10,373,368 B2 | 8/2019 | Westerhoff |
| 10,380,970 B2 | 8/2019 | Westerhoff |
| 10,395,398 B2 | 8/2019 | Westerhoff |
| 10,430,914 B2 | 10/2019 | Westerhoff |
| 10,540,803 B2 | 1/2020 | Westerhoff |
| 10,614,543 B2 | 4/2020 | Westerhoff |
| 10,631,812 B2 | 4/2020 | Westerhoff |
| 10,686,868 B2 | 6/2020 | Westerhoff |
| 10,706,538 B2 | 7/2020 | Westerhoff |
| 2001/0026848 A1 | 10/2001 | Van Der Mark |
| 2002/0016813 A1 | 2/2002 | Woods et al. |
| 2002/0034817 A1 | 3/2002 | Henry et al. |
| 2002/0049825 A1 | 4/2002 | Jewett et al. |
| 2002/0080143 A1 | 6/2002 | Morgan et al. |
| 2002/0089587 A1 | 7/2002 | White et al. |
| 2002/0099290 A1 | 7/2002 | Haddad |
| 2002/0099844 A1 | 7/2002 | Baumann et al. |
| 2002/0120727 A1 | 8/2002 | Curley et al. |
| 2002/0123680 A1 | 9/2002 | Vailant |
| 2002/0138019 A1 | 9/2002 | Wexler |
| 2002/0150202 A1 | 10/2002 | Harding |
| 2002/0150285 A1 | 10/2002 | Nelson |
| 2002/0180747 A1 | 12/2002 | Lavelle et al. |
| 2002/0184238 A1 | 12/2002 | Chylla |
| 2002/0184349 A1 | 12/2002 | Manukyan |
| 2003/0001842 A1 | 1/2003 | Munshi |
| 2003/0031352 A1 | 2/2003 | Nelson et al. |
| 2003/0059110 A1 | 3/2003 | Wilt |
| 2003/0065268 A1 | 4/2003 | Chen et al. |
| 2003/0086599 A1 | 5/2003 | Armato |
| 2003/0103666 A1 | 6/2003 | Edie et al. |
| 2003/0120743 A1 | 6/2003 | Coatney et al. |
| 2003/0123720 A1 | 7/2003 | Launav et al. |
| 2003/0149812 A1 | 8/2003 | Schoenthal et al. |
| 2003/0158786 A1 | 8/2003 | Yaron |
| 2003/0176780 A1 | 9/2003 | Arnold |
| 2003/0179197 A1 | 9/2003 | Sloan et al. |
| 2003/0194049 A1 | 10/2003 | Claus et al. |
| 2003/0220569 A1 | 11/2003 | Dione |
| 2003/0220772 A1 | 11/2003 | Chiang et al. |
| 2003/0227456 A1 | 12/2003 | Gritz |
| 2003/0234791 A1 | 12/2003 | Boyd et al. |
| 2004/0010397 A1 | 1/2004 | Barbour et al. |
| 2004/0012596 A1 | 1/2004 | Allen et al. |
| 2004/0015062 A1 | 1/2004 | Ntziachristos et al. |
| 2004/0022348 A1 | 2/2004 | Heumann |
| 2004/0059822 A1 | 3/2004 | Jiang |
| 2004/0066384 A1 | 4/2004 | Ohba |
| 2004/0066385 A1 | 4/2004 | Kilgard |
| 2004/0066891 A1 | 4/2004 | Freytag |
| 2004/0078238 A1 | 4/2004 | Thomas et al. |
| 2004/0102688 A1 | 5/2004 | Walker |
| 2004/0125103 A1 | 7/2004 | Kaufman |
| 2004/0133652 A1 | 7/2004 | Miloushev et al. |
| 2004/0147039 A1 | 7/2004 | Van Der Mark |
| 2004/0162677 A1 | 8/2004 | Bednar |
| 2004/0170302 A1 | 9/2004 | Museth et al. |
| 2004/0210584 A1 | 10/2004 | Nir et al. |
| 2004/0215858 A1 | 10/2004 | Armstrong et al. |
| 2004/0215868 A1 | 10/2004 | Solomon et al. |
| 2004/0239672 A1 | 12/2004 | Schmidt |
| 2004/0240753 A1 | 12/2004 | Hu |
| 2005/0012753 A1 | 1/2005 | Karlov |
| 2005/0017972 A1 | 1/2005 | Poole et al. |
| 2005/0066095 A1 | 3/2005 | Mullick et al. |
| 2005/0088440 A1 | 4/2005 | Sloan et al. |
| 2005/0128195 A1 | 6/2005 | Houston et al. |
| 2005/0152590 A1 | 7/2005 | Thieret |
| 2005/0165623 A1 | 7/2005 | Landi et al. |
| 2005/0225554 A1 | 10/2005 | Bastos et al. |
| 2005/0231503 A1 | 10/2005 | Heng et al. |
| 2005/0239182 A1 | 10/2005 | Berzin |
| 2005/0240628 A1 | 10/2005 | Jiang et al. |
| 2005/0256742 A1 | 11/2005 | Kohan et al. |
| 2005/0259103 A1 | 11/2005 | Kilgard et al. |
| 2005/0270298 A1 | 12/2005 | Thieret |
| 2005/0271302 A1 | 12/2005 | Khamene et al. |
| 2006/0010438 A1 | 1/2006 | Brady et al. |
| 2006/0010454 A1 | 1/2006 | Napoli et al. |
| 2006/0028479 A1 | 2/2006 | Chun |
| 2006/0034511 A1 | 2/2006 | Verstraelen |
| 2006/0066609 A1 | 3/2006 | Iodice |
| 2006/0197780 A1 | 9/2006 | Watkins et al. |
| 2006/0214949 A1 | 9/2006 | Zhang |

(56) References Cited

U.S. PATENT DOCUMENTS

| | | | |
|---|---|---|---|
| 2006/0239540 A1 | 10/2006 | Serra | |
| 2006/0239589 A1 | 10/2006 | Omernick | |
| 2006/0282253 A1 | 12/2006 | Buswell et al. | |
| 2007/0005798 A1 | 1/2007 | Gropper et al. | |
| 2007/0038939 A1 | 2/2007 | Challen | |
| 2007/0046966 A1 | 3/2007 | Mussack | |
| 2007/0067497 A1 | 3/2007 | Craft et al. | |
| 2007/0092864 A1 | 4/2007 | Reinhardt | |
| 2007/0097133 A1 | 5/2007 | Stauffer et al. | |
| 2007/0116332 A1 | 5/2007 | Cai et al. | |
| 2007/0127802 A1 | 6/2007 | Odry | |
| 2007/0156955 A1 | 7/2007 | Royer, Jr. | |
| 2007/0165917 A1 | 7/2007 | Cao et al. | |
| 2007/0185879 A1 | 8/2007 | Roublev et al. | |
| 2007/0188488 A1 | 8/2007 | Choi | |
| 2007/0226314 A1 | 9/2007 | Eick et al. | |
| 2007/0255704 A1 | 11/2007 | Baek et al. | |
| 2007/0280518 A1 | 12/2007 | Nowinski | |
| 2008/0009055 A1 | 1/2008 | Lewnard | |
| 2008/0042923 A1 | 2/2008 | De Laet | |
| 2008/0086557 A1 | 4/2008 | Roach | |
| 2008/0115139 A1 | 5/2008 | Inglett et al. | |
| 2008/0137929 A1 | 6/2008 | Chen et al. | |
| 2008/0147554 A1 | 6/2008 | Stevens et al. | |
| 2008/0155890 A1 | 7/2008 | Oyler | |
| 2008/0174593 A1 | 7/2008 | Ham | |
| 2008/0208961 A1 | 8/2008 | Kim et al. | |
| 2008/0224700 A1 | 9/2008 | Sorensen | |
| 2008/0281908 A1 | 11/2008 | McCanne et al. | |
| 2008/0317317 A1 | 12/2008 | Shekhar | |
| 2009/0005693 A1 | 1/2009 | Brauner et al. | |
| 2009/0043988 A1 | 2/2009 | Archer et al. | |
| 2009/0077097 A1 | 3/2009 | Lacapra et al. | |
| 2009/0147793 A1 | 6/2009 | Hayakawa et al. | |
| 2009/0208082 A1 | 8/2009 | Westerhoff et al. | |
| 2009/0210487 A1 | 8/2009 | Westerhoff et al. | |
| 2009/0225076 A1 | 9/2009 | Vlietinck | |
| 2009/0245610 A1 | 10/2009 | Can et al. | |
| 2009/0313170 A1 | 12/2009 | Goldner et al. | |
| 2010/0054556 A1 | 3/2010 | Novatzky | |
| 2010/0060652 A1 | 3/2010 | Karlsson | |
| 2010/0123733 A1 | 5/2010 | Zaharia | |
| 2010/0174823 A1 | 7/2010 | Huang | |
| 2010/0272342 A1 | 10/2010 | Berman et al. | |
| 2010/0278405 A1 | 11/2010 | Kakadiaris et al. | |
| 2011/0044524 A1 | 2/2011 | Wang et al. | |
| 2011/0112862 A1 | 5/2011 | Yu | |
| 2012/0078088 A1 | 3/2012 | Whitestone et al. | |
| 2012/0226916 A1 | 9/2012 | Hahn | |
| 2012/0233153 A1 | 9/2012 | Roman et al. | |
| 2013/0176319 A1 | 7/2013 | Westerhoff | |
| 2013/0195329 A1 | 8/2013 | Canda | |
| 2015/0213288 A1 | 7/2015 | Bilodeau et al. | |
| 2016/0012181 A1 | 1/2016 | Massey | |
| 2017/0011514 A1 | 1/2017 | Westerhoff | |
| 2017/0346883 A1 | 3/2017 | Westerhoff | |
| 2017/0098329 A1 | 4/2017 | Westerhoff | |
| 2017/0104811 A1 | 4/2017 | Westerhoff | |
| 2017/0178593 A1 | 6/2017 | Westerhoff | |
| 2019/0318512 A1 | 10/2019 | Westerhoff | |

FOREIGN PATENT DOCUMENTS

| | | |
|---|---|---|
| EP | 0502187 | 9/1992 |
| EP | 0611181 | 8/1994 |
| EP | 0476070 | 8/1996 |
| EP | 0925556 | 6/1999 |
| EP | 0953943 | 11/1999 |
| EP | 0964 366 | 12/1999 |
| EP | 187340 | 3/2001 |
| EP | 2098895 | 9/2009 |
| EP | 2098994 | 9/2009 |
| EP | 2405344 | 1/2012 |
| WO | WO9016072 | 12/1990 |
| WO | WO9102320 | 2/1991 |
| WO | WO9205507 | 4/1992 |
| WO | WO9642022 | 12/1996 |
| WO | WO9810378 | 3/1998 |
| WO | WO9812667 | 3/1998 |
| WO | WO9833057 | 7/1998 |
| WO | WO0120546 | 3/2001 |
| WO | WO0134027 | 5/2001 |
| WO | WO0163561 | 8/2001 |
| WO | WO0174238 | 10/2001 |
| WO | WO0185022 | 11/2001 |
| WO | WO0241760 | 5/2002 |
| WO | WO02067201 | 8/2002 |
| WO | WO02082065 | 10/2002 |
| WO | WO03061454 | 7/2003 |
| WO | WO03088133 | 10/2003 |
| WO | WO03090171 | 10/2003 |
| WO | WO03098539 | 11/2003 |
| WO | WO04019782 | 3/2004 |
| WO | WO04020996 | 3/2004 |
| WO | WO04020997 | 3/2004 |
| WO | WO04034087 | 4/2004 |
| WO | WO04044848 | 5/2004 |
| WO | WO04066215 | 8/2004 |
| WO | WO04072906 | 8/2004 |
| WO | WO05071601 | 8/2005 |
| WO | WO09029636 | 3/2009 |
| WO | WO09067675 | 5/2009 |
| WO | WO09067680 | 5/2009 |
| WO | WO11065929 | 6/2011 |
| WO | WO2015063188 | 5/2015 |

OTHER PUBLICATIONS

Boone et al., Recognition of Chest Radiograph Orientation for Picture Archiving and Communications Systems Display Using Neural Networks, J. Digital Imaging, 1992, 5(3), 190-193.

Boone et al., Automated Recognition of Lateral from PA Chest Radiographs: Saving Seconds in a PACS Environment, J. Digital Imaging, 2003, 16(4), 345-349.

Luo et al., Automatic Image Hanging Protocol for Chest Radiographs in a PACS, IEEE Transactions on Information Technology in Biomedicine, 2006, 10(2), 302-311.

Cabral et al., Accelerated Volume Rendering and Tomographic Reconstruction Using Texture Mapping Hardware*, Silicon Graphics Computer Systems, 1995 IEEE, DD. 91-97.

Carr, Nathan A., Jesse D. Hall, John C. Hart, The ray engine, Proceedings of the ACM SIGGRAPH/EUROGRAPHICS conference on Graphics hardware, Sep. 1-2, 2002, pp. 37-46.

Chidlow, et al., Rapid Emission Tomography Reconstruction, Proceedings of the 2003 Eurographics/IEEE TVCG Workshop on Volume Graphics, Tokyo, Japan, Jul. 7-8, 2003, 13 pages.

Cohen, Michael, et al., A Progressive Refinement Approach to Fast Radiosity Image Generation, Computer Graphics, vol. 22, No. 4, Aug. 1988, pp. 75-84.

Corner, B., University of Nebraska-Lincoln, MatLab.txt, 2003, 1 page.

Dachille, et al., High-Quality Volume Rendering Using Texture Mapping Hardware, Siggraph/Eurographics Hardware Workshop (1998) (8 pages).

Dempster, et al., Maximum Likelihood From Incomplete Data via the EM Algorithm, Harvard University and Educational Testing Service, Dec. 8, 1976, pp. 1-38.

Dennis, C, et al.,, Overview of X-Ray Computed Tomography, http://www.howstuffworks.eom/framed.htm?parent=c . . . tm&url= http://www.ctlab.geo.utexas.edu/overview/, Dec. 26, 2002, 5 pages.

Dobbins, et al., Digital X-Ray Tomosynthesis: Current State of the Art and Clinical Potential, Physics in Medicine and Biology, vol. 48, pp. R65-R106 (2003).

Doggett, Michael, ATI, Programmability Features of Graphics Hardware, (paper) Apr. 23, 2002, pp. C1-C22.

Doggett, Michael, ATI, Programmability Features of Graphics Hardware, (slideshow) slides 1-62 31 pages.

Du, H., Sanchez-Elez, M., Tabrizi, N., Bagherzadeh, N., Anido, M. L., and Fernandez, M. 2003. Interactive ray tracing on reconfigur-

(56) References Cited

OTHER PUBLICATIONS able SIMD MorphoSys. In Proceedings of the 2003 Conference on Asia South Pacific Design Automation (Kitakyushu, Japan, Jan. 21-24, 2003). ASPDAC. ACM, New York, NY, 471-476.
Eldridge Matthew, Homan Igehy, Pat Hanrahan, Pomegranate: a fully scalable graphics architecture, Proceedings of the 27th annual conference on Computer graphics and interactive techniques, p. 443-454, Jul. 2000.
Fang, L., et al., Fast Maximum Intensity Projection Algorithm Using Shear Warp Factorization and Reduced Resampling, Mangetic Resonance in Medicine 47:696-700 (2002).
Filtered Backprojection Reconstruction, http://www.physics.ubd.ca/-mirg/home/tutorial/fbDrecon.html, 216/2003, 5 pages.
Goddard et al., High-speed cone-beam reconstruction: an embedded systems approach, 2002, SPIE vol. 4681, pp. 483-491.
Grass et al., Three-dimensional reconstruction of high contrast objects using C-arm image intensifier projection data, 1999, Computerized Medical Imaging and Graphics, 23, pp. 311-321.
Hadwiger, Markus, et al., Hardware-Accelerated High-Quality Reconstruction of Volumetric Data on PC Graphics Hardware, VRVis Research Center, Vienna, Austria, and Institute of Computer Graphics and Algorithms, Vienna University of Technology, Austria, 9 pages.
Hastreiter et al. (Integrated registration and visualization of medical image data, Proc. Computer Graphics International, Jun. 22-26, 1998, pp. 78-85).
Hopf, M., Ertl, T., Accelerating 3d Convolution Using Graphics Hardware, Proc. IEEE Visualization, 1999, 5 pages.
Hudson, et al., Accelerated Image Reconstruction Using Ordered Subsets of Projection Data, IEEE Transactions on Medical Imaging, vol. 13, No. 4, Dec. 1994, pp. 601-609.
Image Registration Slideshow, 105 pages.
Iterative definition, Merriam-Webster on-line dictionary, printed Aug. 26, 2010, 3 pages.
Jain, Anju, A Programmable Graphics Chip, pcquest.com, Jun. 18, 2001.
Jones et al., Positron Emission Tomographic Images and Expectation Maximization: A VLSI Architecture for Multiple Iterations Per Second, Computer Technology and Imaging, Inc., 1988 IEEE, pp. 620-624.
Kajiya, J. T., Ray tracing volume densities, Proc. Siggraph, Jul. 1984, Computer Graphics, vol. 18, No. 3, pp. 165-174.
Karlsson, Filip; Ljungstedt, Carl Johan; Ray tracing fully implemented on programmable graphics hardware, Master's Thesis, Chalmers University of Technology, Dept. of Computer Engineering, Goteborg, Sweden, copyright © 2004, 29 pages.
Kruger J. and R. Westermann, Acceleration Techniques for GPU-based Volume Rendering, Proceedings of IEEE Visualization, 2003, 6 pages.
Lange et al., EM Reconstruction Algorithms for Emission and Transmission Tomography, J Computer Assisted Tomography 8, DD. 306, et seq. (1984).
Lange et al., Globally Convergent Algorithms for Maximum a Posteriori Transmission Tomography, IEEE Transactions on Image Processing, Vo. 4, No. 10, Oct. 1995, pp. 1430-1438.
Li et al., Tomographic Optical Breast Imaging Guided by Three-Dimensional Mammography, Applied Optics, Sep. 1, 2003, vol. 42, No. 25, pp. 5181-5190.
Li, et al., A Brick Caching Scheme for 30 Medical Imaging, Apr. 15-18, 2004, IEEE International Symposium on Biomedical Imaging: Macro to Nano 2004, vol. 1, pp. 563-566.
Maes, et al. Multimodality Image Registration by Maximization of Mutual Information, IEEE Tran. on Medical Imaging, vol. 16, No. 2, Apr. 1997. pp. 187-198).
Max, N., Optical Models for Direct Volume Rendering, IEEE Transactions on Visualization and Computer Graphics, Jun. 1995, 1(2): pp. 99-108.
McCool, M. et al., Shader Algebra, 2004, pp. 787-795.

McCool, Michael J., Smash: A Next-Generation API for Programmable Graphics Accelerators, Technical Report CS-200-14, Computer Graphics Lab Dept. of Computer Science, University of Waterloo, Aug. 1, 2000.
Microsoft, Architectural Overview Direct for 3D, http://msdn.microsoft.com/library/default.asp?url=/library/en-us/dx8_c/directx_cpp/Graphics/ProgrammersGuide/GettingStarted/Architecture, 12120/2002, 22 pages.
Mitchell, Jason L., RadeonTM 9700 Shading, SIGGRAPH 2002—State of the Art in Hardware Shading Course Notes, DD.3.1-1-3.1-39, 39 pages.
Mitschke et al., Recovering the X-ray projection geometry for three-dimensional tomographic reconstruction with additional sensors: Attached camera versus external navigation system, 2003, Medical Image Analysis, vol. 7, pp. 65-78.
Mueller, K., and R. Yagel, Rapid 3-D Cone Beam Reconstruction With the Simultaneous Algebraic Reconstruction Technique (SART) Using 2-D Texture Mapping Hardware, IEEE Transactions on Medical Imaging, Dec. 2000, 19(12): pp. 1227-1237.
Navab, N., et al., 3D Reconstruction from Projection Matrices in a C-Arm Based 3D-Angiography System, W.M. Wells e al., eds., MICCAI'98, LNCS 1496, pp. 119-129, 1998.
Parker, S., et al., Interactive Ray Tracing for Isosurface rendering, IEEE, 1998, pp. 233-258.
PCT/US2008/084282, Preliminary and International Search Reports, dated May 11, 2011, 7 pages.
PCT/US2005/000837, Preliminary and International Search Reports, dated May 11, 2005, 7 pages.
PCT/US2008/74397, Preliminary and International Search Reports, dated Dec. 3, 2008, 7 pages.
PCT/US2008/84368, Preliminary and International Search Reports, dated Jan. 13, 2009, 7 pages.
PCT/EP2016/067886, Preliminary and International Search Reports, dated Jan. 17, 2017, 18 pages.
PCT/EP2018/075744, Preliminary and International Search Reports, dated Feb. 1, 2019, 17 pages.
PCT/US2008/84376, Preliminary and International Search Reports, dated Jan. 12, 2009, 6 pages.
JP2018-524544, Office Action, dated Jun. 2, 2020, 4 pages (& English translation).
EP3329405, Office Action, dated Apr. 6, 2020, 5 pages.
Pfister, H., et al., The VolumePro real-time ray-casting System, Computer Graphics Proceedings of SIGGRAPH), Aug. 1999, No. 251-260.
Phong, B. T. Illumination for Computer Generated Pictures, Communications of the ACM, 18(6), Jun. 1975, pp. 311-317.
Porter, D. H. 2002. Volume Visualization of High Resolution Data using PC-Clusters. Tech. rep., University of Minnesota. Available at http://www.lcse.umn.edu/hvr/pc_vol_rend_L.pdf.
Potmesil, M. and Hoffert, E. M. 1989. The pixel machine: a parallel image computer. In Proceedings of the 16th Annual Conference on Computer Graphics and interactive Techniques SIGGRAPH '89. ACM, New York, NY, 69-78.
Purcell, T., et al., Real-time Ray Tracing on Programmable Graphics Hardware, Department of Computer Science, Stanford University, Stanford, CA, Submitted for review to SIGGRAPH 2002, 2002. http://graphics.stanford.edu/papers/rtongfx/rtongfx_submit.pdf.
Purcell, T., et al., Ray tracings on Programmable Graphics Hardware, Computer Graphics (Proceedings of SIGGRAPH), 1998, pp. 703-712.
Purcell, Timothy J., Craig Donner, Mike Cammarano, Henrik Wann Jensen, Pat Hanrahan, Photon mapping on programmable graphics hardware, Proceedings of the ACM SIGGRAPH/EUROGRAPH-ICS conference on Graphics hardware, Jul. 26-27, 2003, 11 pages.
Ramirez et al. (Prototypes stability analysis in the design of a binning strategy for mutual information based medical image registration, IEEE Annual Meeting of the Fuzzy Information, Jun. 27-30, 2004, vol. 2, pp. 862-866.
Rib Cage Projection, downloaded from http://www.colorado.edu/physics/2000/tomography/final_rib_cage.html on Dec. 26, 2002, 3 pages.

(56) References Cited

OTHER PUBLICATIONS

Roettger, Stefan, et al., Smart Hardware-Accelerated Volume Rendering, Joint EUROGRAPHICS—IEEE TCVG Symposium on Visualization, 2003, pp. 231-238, 301.

Sandborg, Michael, Computed Tomography: Physical principles and biohazards, Department of Radiation Physics, Faculty of Health Sciences, Linkoping University, Sweden, Report 81 ISSN 1102-1799, Sep. 1995 ISRN ULI-RAD-R-81-SE, 18 pages.

Sarrut et al. (Fast 30 Image Transformations for Registration Procedures, Proc. Int. Conf. on Image Analysis and Processing, Sep. 27-29, 1999, pp. 446-451.

Selldin, Hakan, Design and Implementation of an Application Programming Interface for Volume Rendering, Linkopings Universitet.

Shekhar, R.; Zagrodsky, V., Cine MPR: interactive multiplanar reformatting of four-dimensional cardiac data using hardware-accelerated texture mapping, IEEE Transactions on Information Technology in Biomedicine, vol. 7, No. 4, pp. 384-393, Dec. 2003.

Silver, et al., Determination and correction of the wobble of a C-arm gantry, Medical Imaging 2000: Image Processing, Kenneth M. Hanson, ed., Proceedings of SPIE vol. 3970 (2000).

Stevens, Grant, et al., Alignment of a Volumetric Tomography System, Med. Phys., 28 (7), Jul. 2001.

Tao, W., Tomographic mammography using a limited number of low dose cone beam projection images, Medical Physics, AIP, Melville, NY vol. 30, pp. 365-380, Mar. 2003, ISSN: 0094-2405.

Tasdtzen, T., Ross Whitaker, Paul Burchard , Stanley Osher, Geometric surface processing via normal maps, ACM Transactions on Graphics (TOG), v.22 n.4, p. 1012-1033, Oct. 2003.

Tasdizen, T.; Whitaker, R.; Burchard, P.; Osher, S.; Geometric surface smoothing via anisotropic diffusion of normals, IEEE Visualization, VIS 2002, Nov. 2002, pp. 125-132.

Technical Brief: NVIDIA nfiniteFX Engine: Programmable Pixel Shaders, NVIDIA Corporation, 5 pages.

Technical Brief: NVIDIA nfiniteFX Engine: Programmable Vertex Shaders, NVIDIA Corporation, 12 pages.

Viola, I, et al., Hardware Based Nonlinear Filtering and Segmentation Using High Level Shading Languages, Technical Report TR-186-2-03-07, May 2003, 8 pages.

Viola, P., Alignment by Maximization of Mutual Information, PhD Thesis MIT (Also Referred to as—AI Technical report No. 1548), MIT Artificial Intelligence Lab, Jun. 1, 1995, pp. 1-29.

Weiler, M, M. Kraus and T. Ertl, Hardware-Based View-Independent Cell Projection, Proceedings IEEE Symposium on Volume Visualization 2002, pp. 13-22.

Weiler, M. et al., Hardware-based ray casting for tetrahedral meshes, IEEE Visualization, VIS 2003, Oct. 24-24, 2003, pp. 333-340.

Weiler, M. et al., Hardware-Based view-independent Cell Projection, IEEE, 2002, pp. 13-22.

Weiskopf, D., T. Schafhitzel, T. Ertl, GPU-Based Nonlinear Ray Tracing, EUROGRAPHICS, vol. 23, No. 3, Aug. 2004.

Wen, Junhai; Zigang Wang; Bin Li; Zhengrong Liang; An investigation on the property and fast implementation of a ray-driven method for inversion of the attenuated Radon transform with variable focusing fan-beam collimators, 2003 IEEE Nuclear Science Symposium Conference Record, vol. 3, Oct. 19-25, 2003, pp. 2138-2142.

Wikipedia, Anonymous, 'Volume Rendering' May 30, 2015, retrieved Nov. 4, 2016, https://en.wikipedia.org/w/index.php?title=Volume_rendering&oldid=664765767.

Wikipedia, Anonymous, 'Tomographic Reconstruction' Dec. 6, 2014, retrieved Nov. 4, 2016, https://en.wikipedia.org/w/index.php?title=Tomographic_Reconstruction&oldid=636925688.

Wu et al., Tomographic Mammography Using a Limited Number of Low-dose Conebeam Projection Images, Med. Phys., pp. 365-380 (2003).

Xu et al., Toward a Unified Framework for Rapid 30 Computed Tomography on Commodity GPUs, Oct. 19-25, 2003, IEEE Nuclear Science Symposium Conference 2003, vol. 4, pp. 2757-2759.

Xu et al., Ultra-fast 30 Filtered Backprojection on Commodity Graphics Hardware, Apr. 1-18, 2004, IEEE International symposium on Biomedical Imaging: Macro to Nano, vol. 1, pp. 571-574 and corresponding power point presentation.

MULTI-USER MULTI-GPU RENDER SERVER APPARATUS AND METHODS

PRIORITY CLAIM

This application is a continuation of (1) U.S. application Ser. No. 16/403,233 filed May 3, 2019 which claims the benefit of (2) U.S. application Ser. No. 15/640,294 filed Jun. 30, 2017 which claims the benefit of (3) U.S. application Ser. No. 14/641,248 filed Mar. 6, 2015 which issued as U.S. Pat. No. 9,728,165 on Aug. 8, 2017 and which claims the benefit of (4) U.S. application Ser. No. 13/684,464 filed Nov. 23, 2012 which issued as U.S. Pat. No. 9,355,616 on May 31, 2016 which claims the benefit of priority to (5) U.S. application Ser. No. 12/275,421 filed Nov. 21, 2008 which issued as U.S. Pat. No. 8,319,781 on Nov. 27, 2012 which claims the benefit of priority of (6) U.S. Patent Application Ser. No. 60/989,881, filed Nov. 23, 2007, the teachings of which ((1) to (6)) are incorporated herein by reference in their entireties and for all purposes.

BACKGROUND OF THE INVENTION

The invention pertains to digital data processing and, more particularly, by way of example, to the visualization of image data. It has application to areas including medical imaging, atmospheric studies, astrophysics, and geophysics.

3D and 4D image data is routinely acquired with computer tomographic scanners (CT), magnetic resonance imaging scanners (MRI), confocal microscopes, 3D ultrasound devices, positron emission tomographics (PET) and other imaging devices. The medical imaging market is just one example of a market that uses these devices. It is growing rapidly, with new CT scanners collecting ever greater amounts of data even more quickly than previous generation scanners. As this trend continues across many markets, the demand for better and faster visualization methods that allow users to interact with the image data in real-time will increase.

Standard visualization methods fall within the scope of volume rendering techniques (VRT), shaded volume rendering techniques (sVRT), maximum intensity projection (MIP), oblique slicing or multi-planar reformats (MPR), axial/sagittal and coronal slice display, and thick slices (also called slabs). In the following, these and other related techniques are collectively referred to as "volume rendering." In medical imaging, for example, volume rendering is used to display 3D images from 3D image data sets, where a typical 3D image data set is a large number of 2D slice images acquired by a CT or MRI scanner and stored in a data structure.

The rendition of such images can be quite compute intensive and therefore takes a long time on a standard computer, especially, when the data sets are large. Too long compute times can, for example, prevent the interactive exploration of data sets, where a user wants to change viewing parameters, such as the viewing position interactively, which requires several screen updates per second (typically 5-25 updates/second), thus requiring rendering times of fractions of a second or less per image.

Several approaches have been taken to tackle this performance problem. Special-purchase chips have been constructed to implement volume rendering in hardware. Another approach is to employ texture hardware built into high-end graphics workstations or graphics super-computers, such as for example Silicon Graphics Onyx computers with Infinite Reality and graphics. More recently, standard graphics boards, such as NVIDIA's Geforce and Quadro FX series, as well as AMD/ATI's respective products, are also offering the same or greater capabilities as far as programmability and texture memory access are concerned.

Typically hardware for accelerated volume rendering must be installed in the computer (e.g., workstation) that is used for data analysis. While this has the advantage of permitting ready visualization of data sets that are under analysis, it has several drawbacks. First of all, every computer which is to be used for data analysis needs to be equipped with appropriate volume-rendering hardware, as well as enough main memory to handle large data sets. Second the data sets often need to be transferred from a central store (e.g., a main enterprise server), where they are normally stored, to those local Workstations prior to analysis and visualization, thus potentially causing long wait times for the user during transfer.

Several solutions have been proposed in which data processing applications running on a server are controlled from a client computer, thus, avoiding the need to equip it with the full hardware needed for image processing/visualization and also making data transfer to the client unnecessary. Such solutions include Microsoft's Windows 2003 server (with the corresponding remote desktop protocol (RDP)), Citrix Presentation Server, VNC, or SGI's OpenGL Vizserver. However, most of these solutions do not allow applications to use graphics hardware acceleration. The SGI OpenGL Vizserver did allow hardware accelerated graphics applications to be run over the network: it allocated an InfiniteReality pipeline to an application controlled over the network. However that pipeline could then not be used locally any longer and was also blocked for other users. Thus effectively all that the Vizserver was doing was extending a single workplace to a different location in the network. The same is true for VNC.

For general graphics applications (i.e., not specifically volume rendering applications), such as computer games, solutions have been proposed to combine two graphics cards on a single computer (i.e., the user's computer) in order to increase the rendering performance, specifically NVIDIA's SLI and AMD/ATI's Crossfire products. In these products. both graphics cards receive the exact same stream of commands and duplicate all resources (such as textures). Each of the cards then renders a different portion of the screen—or in another mode one of the cards renders every second image and the other card renders every other image. While such a solution is transparent to the application and therefore convenient for the application developers it is very limited, too. Specifically the duplication of all textures effectively eliminates half of the available physical texture memory.

An object of the invention is to provide digital data processing methods and apparatus, and more particularly, by way of example, to provide improved such methods and apparatus for visualization of image data.

A further object of the invention is to provide methods and apparatus for rendering images.

A still further object of the invention is to provide such methods and apparatus for rendering images as have improved real-time response to a user's interaction.

Yet a still further object of the invention is to provide such methods and apparatus as allow users to interactively explore the rendered images.

SUMMARY OF THE INVENTION

The aforementioned are among the objects attained by the invention, which provides, in one aspect, a graphics system including a render server that has one or more graphics boards in one or more host systems. One or more client computers can simultaneously connect to the render server, which receives messages from the client computers, creates rendered images of data set and sends those rendered images to the client computers for display.

Related aspects of the invention provide a graphics system, for example, as described above in which rendered data sets are kept in memory attached to the render server, such as RAM memory installed in the host systems, e.g., for reuse in response to subsequent messaging by the client computers.

Further related aspects of the invention provide a graphics system, for example, as described above in which the render server maintains a queue of so-called render requests, i.e., a list of images to render. These can comprise render requests received directly in messages from the client computers and/or they can comprise requests generated as a result of such messages. One message received from the client computer can result in zero, one, or multiple render requests being generated.

A further aspect of the invention provides a graphics system, for example, of the type described above, in which the render server breaks down selected ones of the render requests into multiple smaller requests, i.e., requests which require less compute time and/or less graphics resources. A related aspect of the invention provides for scheduling the smaller (and other) requests so as to minimize an average time that a client computer waits for a response to a request. This allows (by way of non-limiting example) for concurrent treatment of requests and for serving multiple client computers with a single GPU without compromising interactivity.

Another aspect of the invention provides a graphics system, For example, of the type described above, that processes render requests in an order determined by a prioritization function that takes into account the nature of the request (e.g., interactive rendering vs. non-interactive), the client from which the request was received, the order in which the requests were received, the resources currently allocated on the graphics boards, and/or other parameters.

Yet another aspect of the invention provides a graphics system, for example, of the type described above that processes multiple render requests simultaneously. The render server of such a system can, for example, issue multiple render commands to a single graphics board and process them in time slices (in a manner analogous to a multi-tasking operating system on a CPU), thereby switching between processing different render requests multiple times before a single render request is completed.

A related aspect of the invention provides a system, for example, as described above wherein the render server combines render requests for simultaneous processing in such a way, that their total graphics resource requirements can be satisfied by resources (e.g., texture and frame buffer memory) on-board a single graphics board. This allows (by way of example) time-slicing between the simultaneously processed render requests without the computationally expensive swapping of graphics memory chunks in and out of main memory of the host (i.e., "host memory").

Another aspect of the invention provides a graphics system, for example, of the type described above, that renders images at different resolution levels, e.g., rendering a low-resolution image from a low-resolution version of the input data while rotating the data set, thus enabling faster rendering times and thereby smoother interaction. A related aspect of the invention provides such a system that adapts the resolution to the network speed and or the available processing resources. Another related aspect of the invention provides such a system wherein the render server continuously monitors one or more of these parameters and thereby allows for continuous adaptation of the resolution.

Another aspect of the invention provides a graphics system, for example, of the type described above, wherein the render server keeps local resources (such as texture memory) on one of the graphics boards allocated for the processing of a particular set of related render requests. Related aspects of the invention provide (for example) for re-use of such allocated resources for the processing of a subsequent render request in the set, thus eliminating the need to re-upload the data from host memory to texture memory for such subsequent render requests. By way of example, the render server of such a system can keep the texture memory of a graphics board allocated to the rendition of interactive render requests for low resolution versions of a data set (e.g., user-driven requests for rotation of the data set), which need to be processed with a minimal latency to allow for smooth interaction but only require a small amount of texture memory.

Another aspect of the invention provides a graphics system, for example, of the type described above, wherein the render server dispatches render commands to different graphics boards. A related aspect provides such a system that takes into account the data sets resident on these different graphics boards and uses this information to optimize such dispatching.

Further aspects of the invention provide systems employing combinations of the features described above.

Further aspects of the invention provide methods for processing images that parallel the features described above.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE INVENTION

Overview

Figure 1:
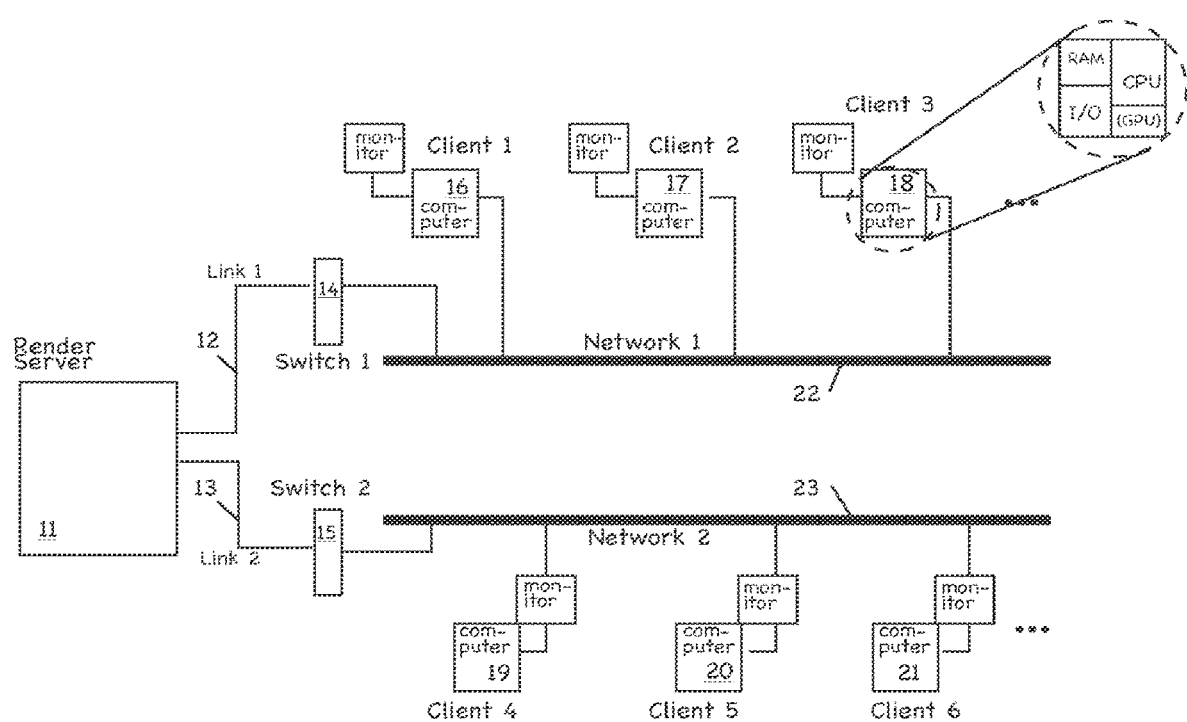
FIG. 1 depicts a client-server system according to one practice of the invention.

FIG. 1 depicts a system 10 according to one practice of the invention. A render server (or server digital data processor) 11, which is described in more detail below, is connected via one or more network interfaces 12, 13 and network devices such as switches or hubs 14, 15 to one or more networks 22, 23. The networks 22, 23 can be implemented utilizing Ethernet, W1Fl, DSL and/or any other protocol technologies and they can be part of the internet and/or form WANs (wide area networks), LANs (local area networks), or other types of networks known in the art.

One or more client computers (or "client digital data processors") 16-21 are coupled to render server 11 for communications via the networks 22, 23. Client software running on each of the client computers 16-21 allows the respective computers 16-21 to establish a network connection to render server 11 on which server software is running. As the user interacts with the client software, messages are sent from the client computers 16-21 to the render server 11. Render server 11, generates render commands in response to the messages, further processing the render requests to generate images or partial images, which are then sent back to the respective client computers 16-21 for further processing and/or display.

The make-up of a typical such client computer is shown, by way of example, in the break-out on FIG. 1. As illustrated, client computer 18 includes CPU 18a, dynamic memory (RAM) 18b, input/output section 18c and optional graphics processing unit 18d, all configured and operated in the conventional manner known in the art—as adapted in accord with the teachings hereof.

The components illustrated in FIG. 1 comprise conventional components of the type known in the art, as adapted in accord with the teachings hereof. Thus, by way of non-limiting example, illustrated render server 11 and client computers 16-21 comprise conventional workstations, personal computers and other digital data processing apparatus of the type available in the market place, as adapted in accord with the teachings hereof.

It will be appreciated that the system 10 of FIG. 1 illustrates just one configuration of digital data processing devices with which the invention may be practiced. Other embodiments may, for example, utilize greater or fewer numbers of client computers, networks, networking apparatus (e.g., switches or hubs) and so forth. Moreover, it will be appreciated that the invention may be practiced with additional server digital data processors. Still further, it will be appreciated that the server digital data processor 11 may, itself, function—at least in part—in the role of a client computer (e.g., generating and servicing its own requests and or generating requests for servicing by other computers) and vice versa.

Render Server

In the following section we describe the render server in more detail and how it is used to perform volume rendering.

Figure 2:
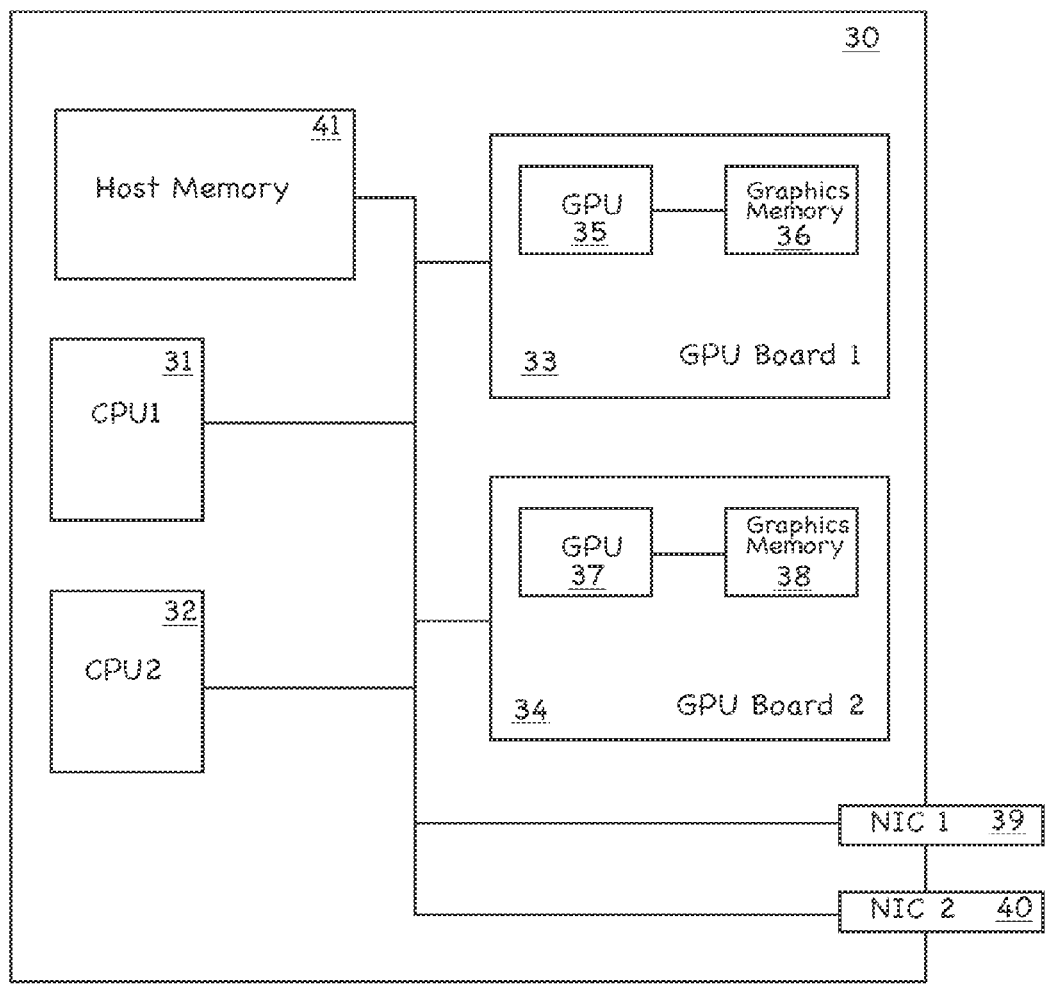
FIG. 2 depicts the host system of the render server of the type used in a system of the type shown in FIG. 1.

FIG. 2 depicts render server 11, which includes one or more host systems 30, each equipped with one or more local graphics (GPU) boards 33, 34. As those skilled in the art will appreciate, a host system has other components as well, such as a chipset, I/O components, etc., which are not depicted in the figure. The host system contains one or more central processing units (CPU) 31, 32, for example AMD Opteron or Intel Xeon CPUs. Each CPU 31, 32 can have multiple CPU cores. Connected to CPUs 31, 32 is a host memory 41.

GPU Boards 33, 34. can be connected to other system components (and, namely, for example, to CPUs 31, 32) using the PCI-Express bus, but other bus systems such as PCI or AGP can be used as well, by way of non-limiting example. In this regard, standard host mainboards exist, which provide multiple PCI-Express slots, so that multiple graphics cards can be installed. If the host system does not have sufficient slots, a daughter card can be used (e.g., of a type such as that disclosed in co-pending commonly assigned U.S. patent application Ser. No. 11/129,123, entitled "Daughter Card Approach to Employing Multiple Graphics Cards Within a System," the teachings of which are incorporated herein by reference). Alternatively, or in addition, such cards can be provided via external cable-connected cages.

Each graphics board 33, 34 has amongst other components local, on—board memory 36, 38, coupled as shown (referred to elsewhere herein as "graphics memory," "Graphics Memory," "texture memory," and the like) and a graphics processing unit (GPU) 35, 37. In order to perform volume rendering of a data set, the data set (or the portion to be processed) preferably resides in graphics memories 36, 38.

The texture (or graphics) memory 36, 38 is normally more limited than host memory 41 and often smaller than the total amount of data to be rendered, specifically for example, as in the case of the illustrated embodiment, if server 11 is used by multiple users concurrently visualizing different data sets. Therefore not all data needed for rendering can, at least in the illustrated embodiment, be kept on graphics boards 33, 34.

Instead, in the illustrated embodiment, in order to render an image, the respective portion of the data set is transferred from either an external storage device or, more typically, host memory 41 into the graphics memories 36, 38 via the system bus 42. Once the data is transferred, commands issued to GPUs 35, 37 by Render Server Software (described below) cause it to render an image with the respective rendering parameters. The resulting image is generated in graphics memories 36, 38 on graphics boards 33, 34 and once finished can be downloaded from graphics boards 33, 34, i.e., transferred into host memory 41, and then after optional post-processing and compression be transferred via network interfaces 39,40 to client computer s 16-21.

The components of host 30 may be interconnected by a system bus 42 as shown. Those skilled in the art will appreciate that other connections and interconnections may be provided as well or in addition.

Render Server Software and Client Software

The process described above, as well as aspects described subsequently, is controlled by software, more specifically software running on Render Server 11 ("Render Server Software") and software running on client computers 16-21 ("Client Software"). The Render Server Software handles network communication, data management, actual rendering, and other data processing tasks such as filtering by way of employing CPUs 31, 32, GPUs 35, 37, or a combination thereof. The Client Software is responsible for allowing the user to interact, for example, to choose a data set to visualize, to choose render parameters such as color, data window, or the view point or camera position when e.g., rotating the data set. The client software also handles network communication with server 11 and client side display. in the following we describe one way how the Render Server Software and Client software can be implemented. In this regard, see, for example, FIG. 13, steps 1301-1310.

A component of the Render Server software listens for incoming network connections. Once a Client computers attempts to connect, the Render Server Software may accept or reject that connection potentially after exchanging authentication credentials such as a username and password and checking whether there are enough resources available on the render server.

The Render Server software listens on all established connections for incoming messages. This can be implemented for example by a loop sequentially checking each connection or by multiple threads, one for each connection, possibly being executed simultaneously on different CPUs or different CPU cores. Once a message is received, it is either processed immediately or added to a queue for later processing. Depending on the message type a response may be sent. Examples for message types are: (i) Request for a list of data sets available on the server—potentially along with filter criteria, (ii) Request to load a data set for subsequent rendering, (m) Request to render a data set with specified rendering parameters and a specified resolution level, (iv) Message to terminate a given connection, (v) message to apply a filter (for example noise removal or sharpening) etc.

Figure 13:
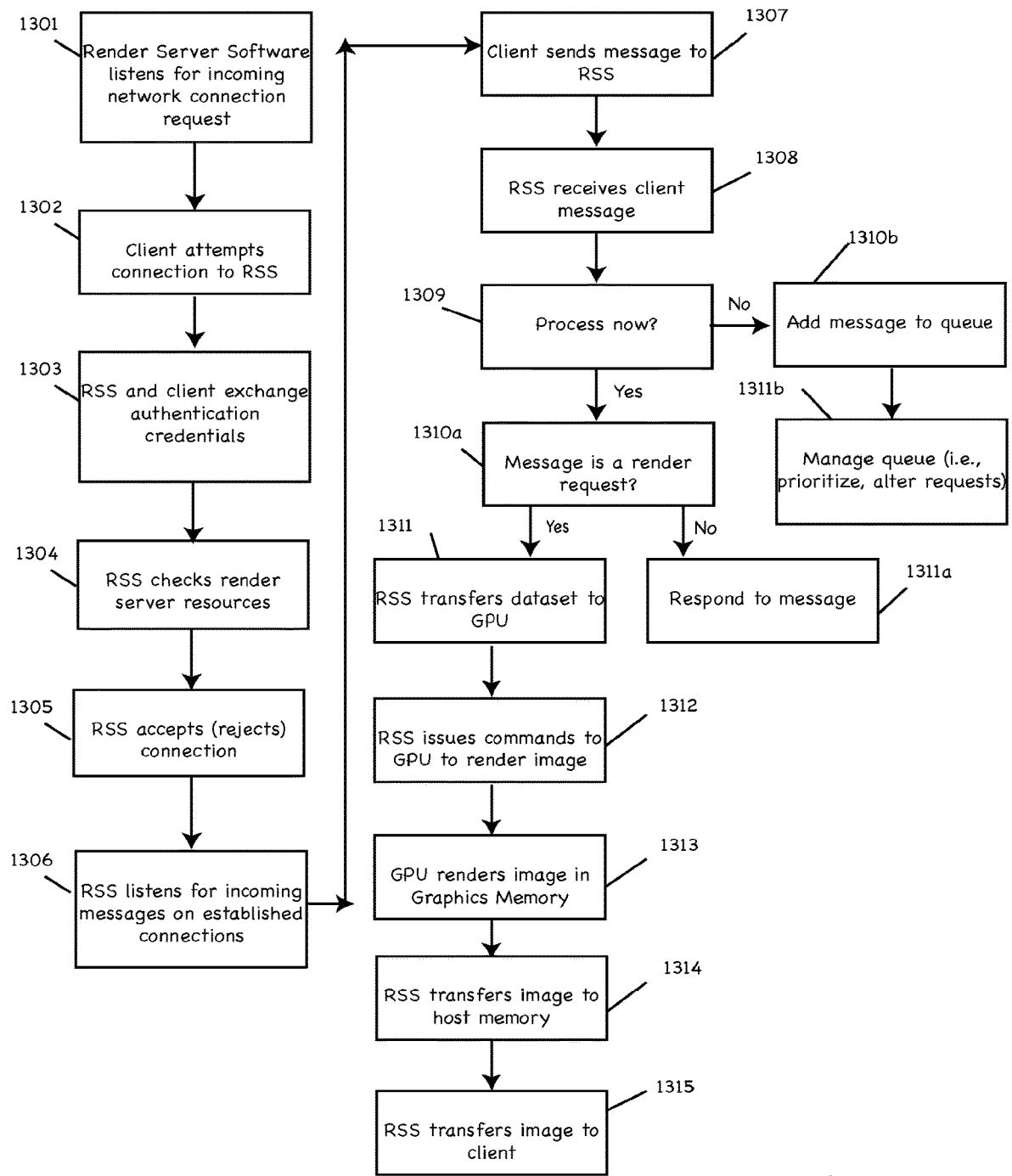
FIG. 13 is a flowchart illustrating a method of operation of the system of the type shown in FIG. 1.

FIG. 13, steps 1311-1315, illustrate the typical case in which the client computer sends a render request and the Render Server Software handles the render request using GPU 35, 37. The Render Server Software transfers the data set in question (or, as is discussed below, portions of it) into local graphics memories 36, 38 via the system bus 42, issues commands to GPUs 35, 37 to create a rendered image in graphics memories 36, 38 and transfers the rendered image back into host memory 41 for subsequent processing and network transfer back to the requesting client computer.

In the illustrated embodiment, a component (e.g., software module) within the Render Server Software prioritizes the requests added to the queue of pending requests thereby determining the order in which they are executed. Other such components of the illustrated embodiment alter requests in the queue, i.e., remove requests which are obsoleted or break down requests into multiple smaller ones (see, step 1311*b*). In these and other embodiments, still another such component of the Render Server Software determines which resources are used to process a request. Other embodiments may lack one or more of these components and/or may include additional components directed toward image rendering and related functions.

In the following, details of these components as well as other aspects are described.

When the Render Server Software handles a render request by way of using the GPU, it transfers the data set in question (or, as is discussed below, portions of it) into the local Graphics Memory via the system bus, then issues the commands necessary to create a rendered image, and then transfers back the rendered image into main memory for subsequent processing and network transfer. Even a single data set can exceed the size of the graphics memory. In order to render such a data set efficiently, it is broken down into smaller pieces which can be rendered independently. We refer to this process as bricking. As discussed later, the ability to break down one render request into multiple smaller requests, where smaller can mean that less graphics memory and/or less GPU processing time is required, is also helpful for efficiently handling multiple requests concurrently.

Figure 7:
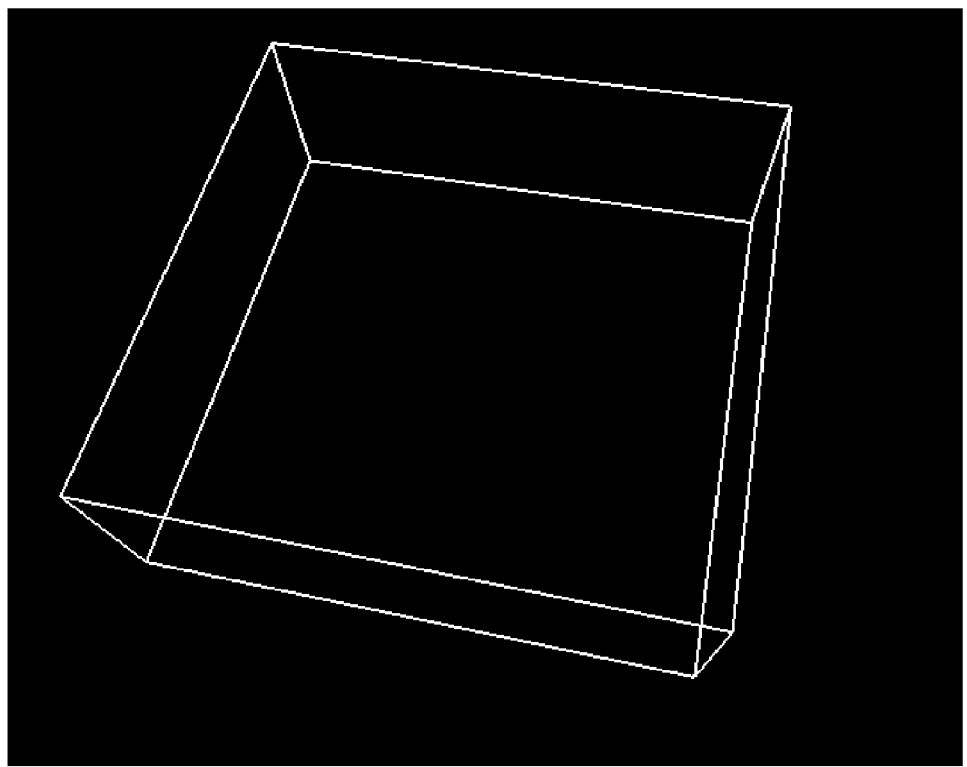
FIG. 7 depicts a 3D data set of the type suitable for processing in a system according to the invention.
Figure 9:
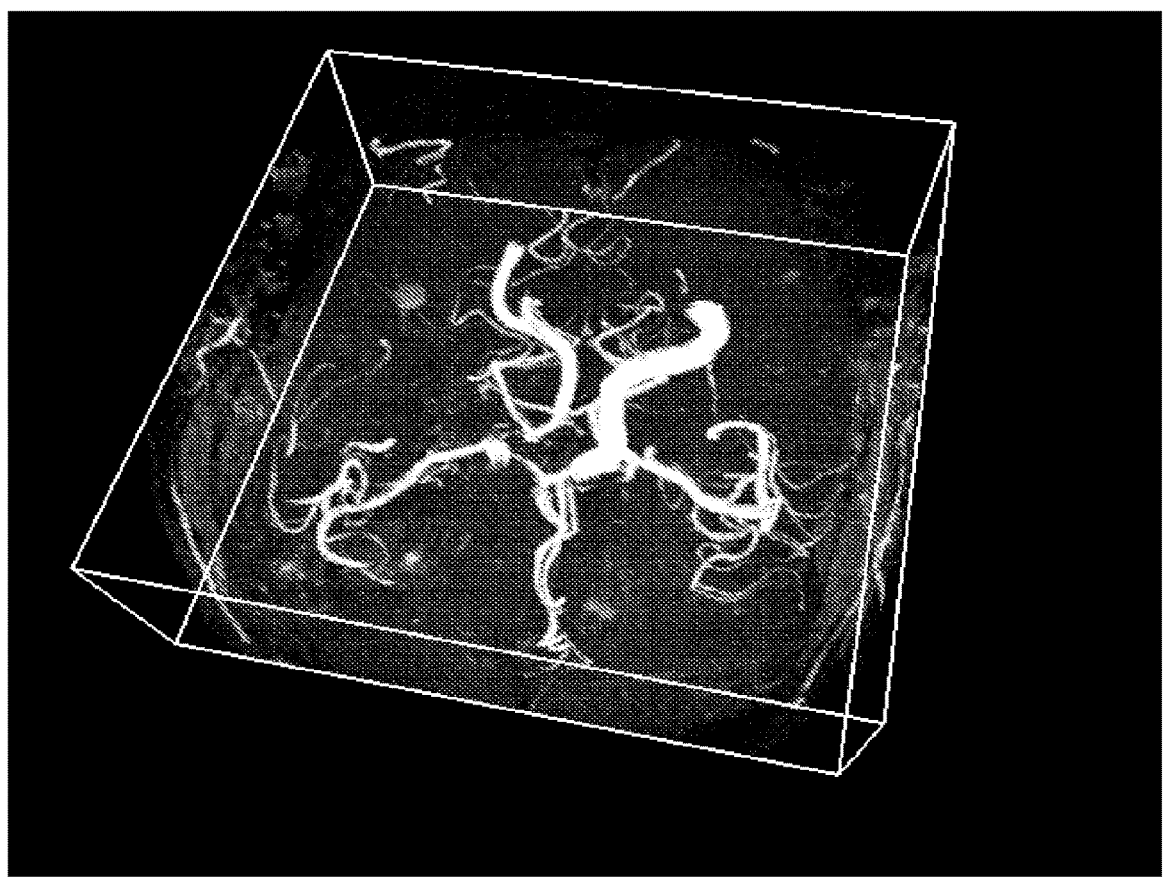
FIG. 9 depicts images resulting from MIP renderings of an image utilizing sub-volumes of the type shown in FIG. 8.
Figure 14:
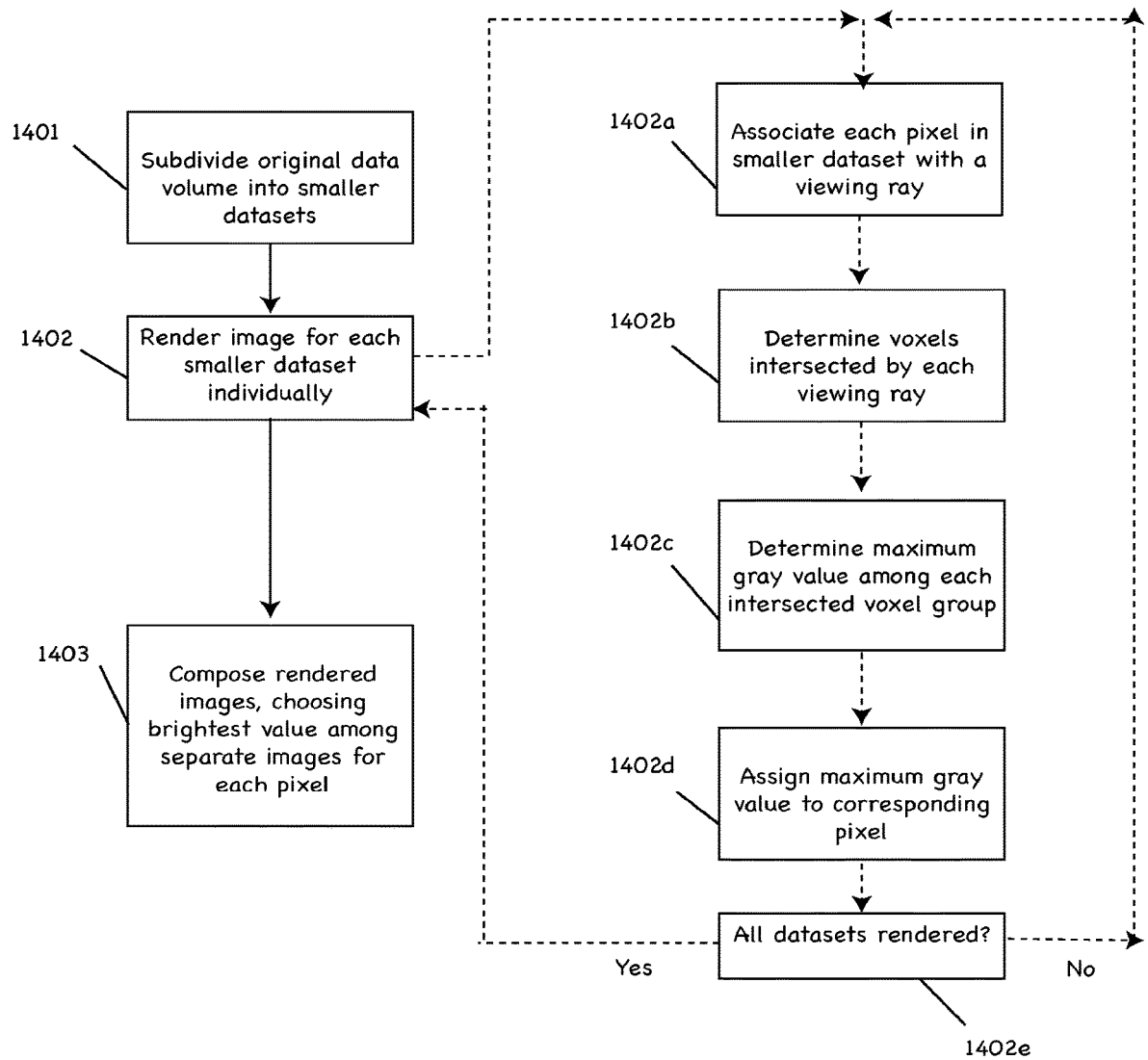
FIG. 14 is a flowchart illustrating a method of utilizing bricking to perform rendering in a system of the type shown in FIG. 1.

We now describe how such a break down can be performed. As an example, we first discuss the MIP rendering mode, though, it will be appreciated that such a methodology can be used with other rendering modes. The 3D data set can be viewed as a cuboid in three-space, consisting of a number of voxels carrying gray values. FIG. 7 depicts that data volume viewed from a certain camera position by way of displaying a bounding box. Referring to FIG. 14 (which illustrates a method for bricking according to one practice of the invention), for a given camera position, each pixel on a computer screen (screen pixel) can be associated with a viewing ray. See, step 1402*a*. The voxels intersected by each such viewing ray which intersects the cuboid are then determined. See, step 1402*b*. In the MIP rendering mode, the screen pixel is assigned the maximum gray value of any of the voxels, which the viewing ray corresponding to the screen pixel intersects. See, step 1402*c*. The resulting rendered image can be seen in FIG. 9.

Figure 8:
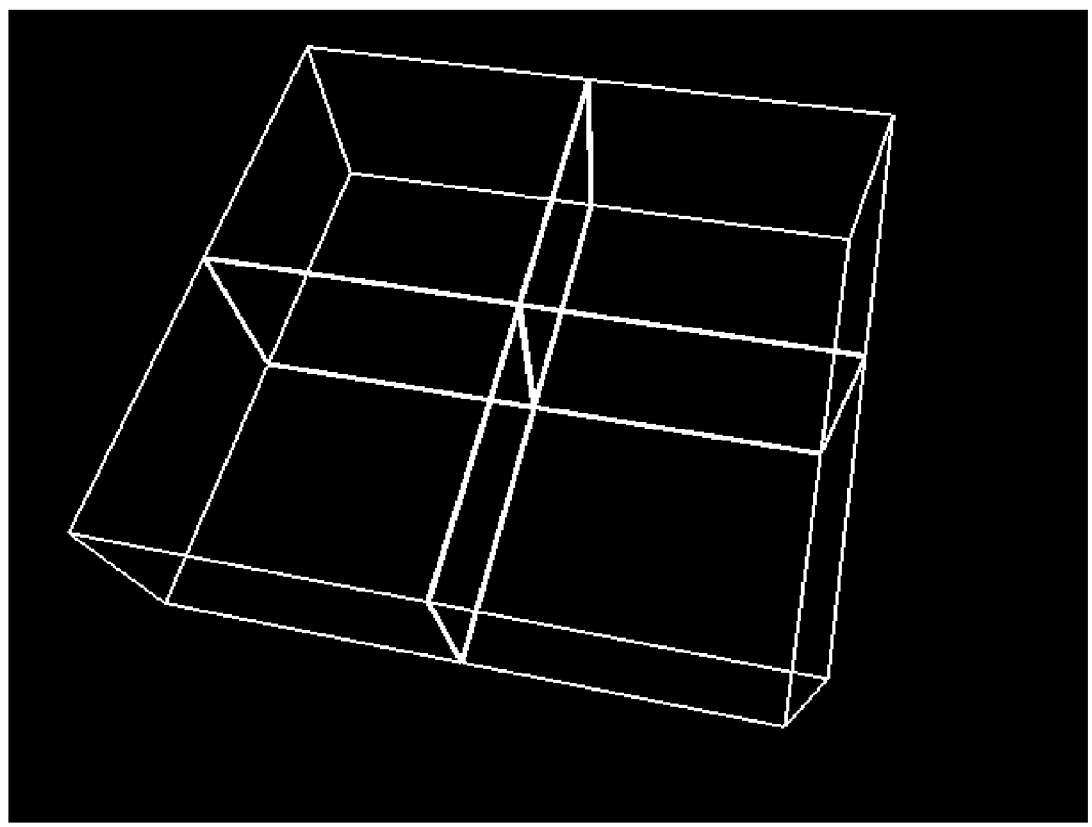
FIG. 8 depicts sub-volumes making up the data set of FIG. 7.
Figure 10:
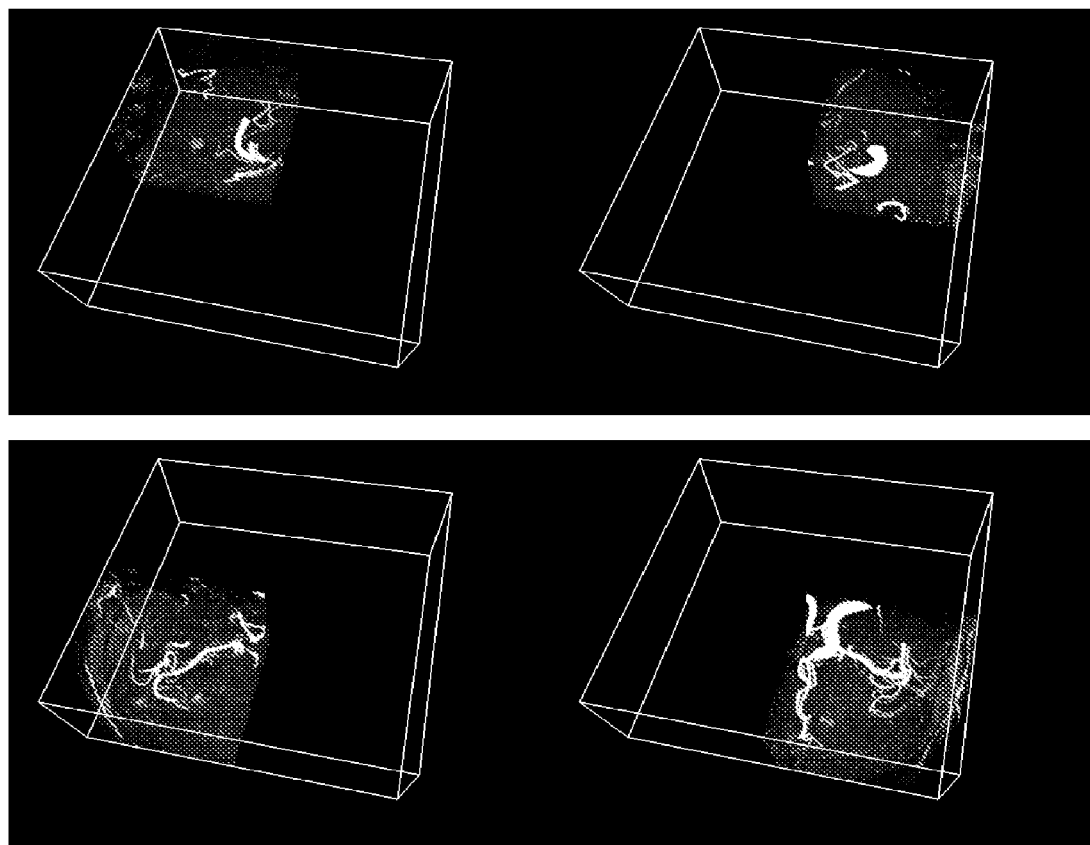
FIG. 10 depicts images resulting from MIP renderings of an image utilizing sub-volumes of the type shown in FIG. 8.
Figure 11:
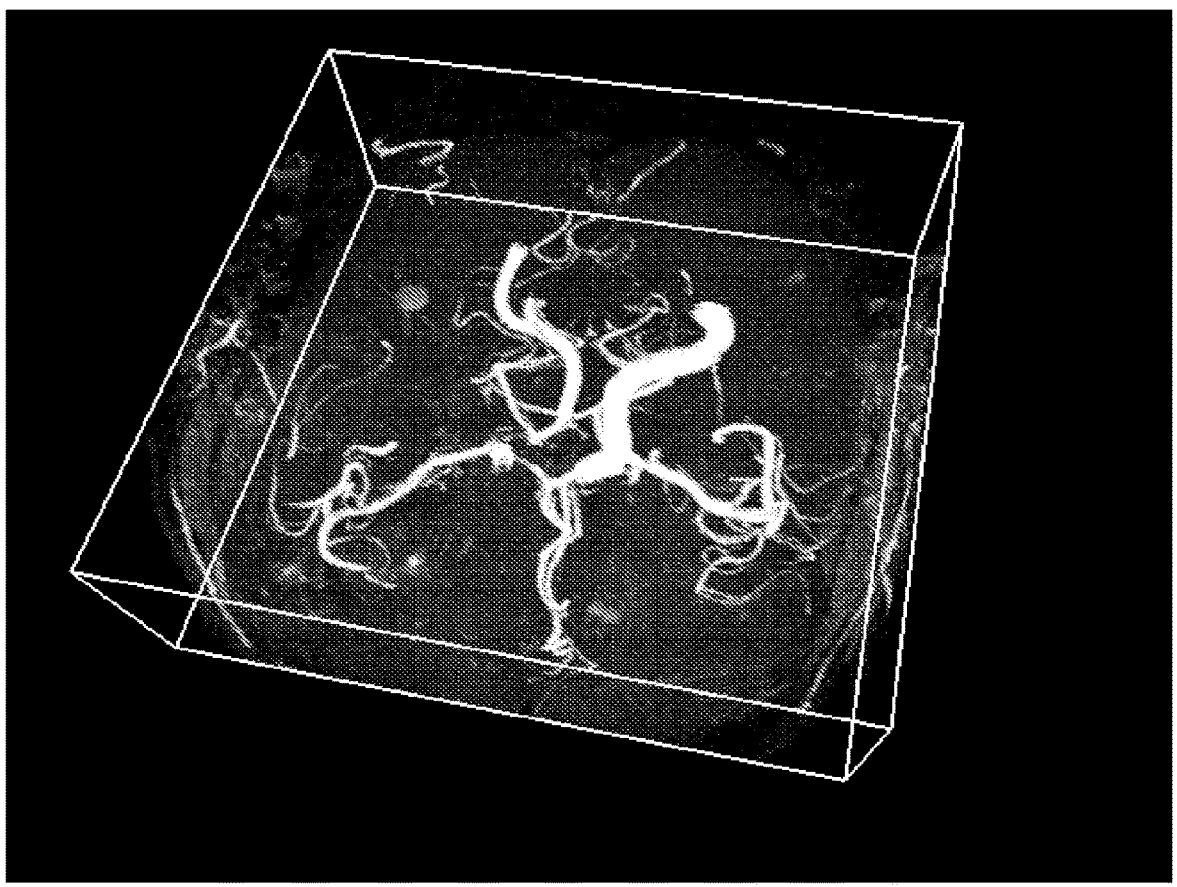
FIG. 11 depicts images resulting from MIP renderings of an image utilizing sub-volumes of the type shown in FIG. 8.

If the Render Server Software subdivides the original data volume into multiple smaller data volumes—for example if it divides the data volume into four sub volumes—then each of the sub volumes can be rendered independently, thus, effectively producing four rendered images. See, FIG. 14, steps 1401 and 1402. The subdivision for this example is illustrated in FIG. 8 by way of showing the bounding boxes of the four sub-volumes. FIG. 10 shows the individual MIP rendition of each of the four sub volumes for an example data set depicting an Magnet Resonance Angiography image. For better orientation, the bounding box of the original data volume is shown as well. If the rendered images are then composed in such a way that for each pixel in the composed image the brightest value for that pixel from the four rendered images is chosen (see, FIG. 14, step 1403), then the resulting composed image, which is shown in FIG. 11, is identical to the MIP rendition of the full data set, seen in FIG. 8.

Figure 12:
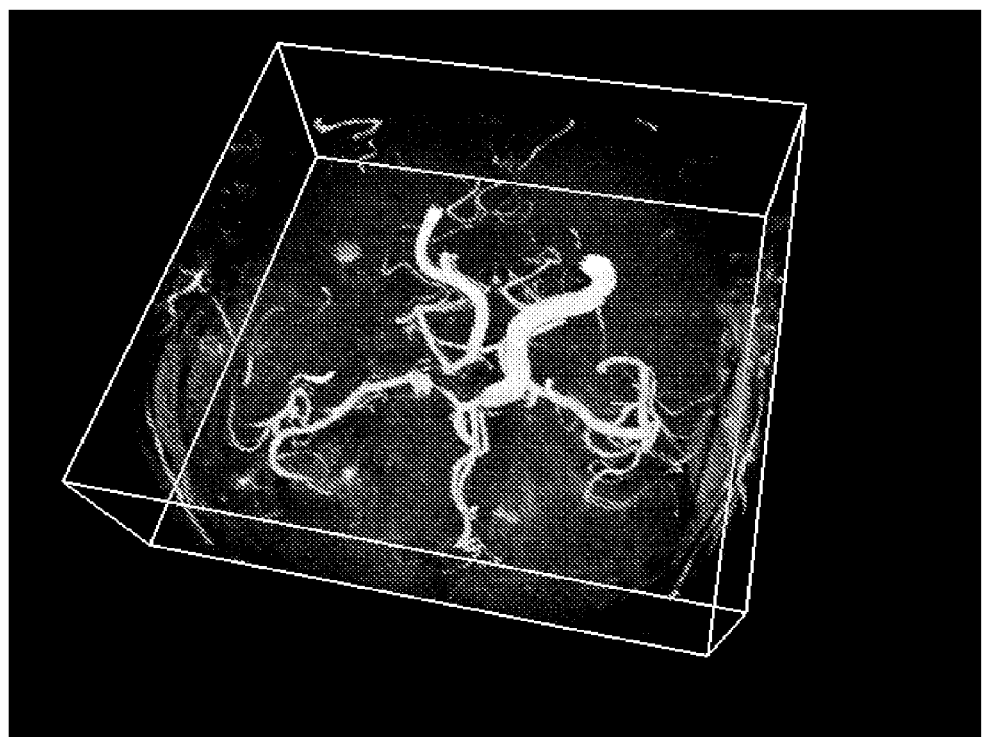
FIG. 12 depicts images resulting from MIP renderings of an image utilizing sub-volumes of the type shown in FIG. 8.

Using the correct composition function, the same breakdown approach can be used for other rendering modes as well. For example, for VRT mode, standard alpha-blending composition can be used, i.e., for each pixel of the resulting image the color an opacity is computed as follows. The sub images are blended over each other in back to front order, one after the other using the formula c_result=(1−a_front)*c_back+a_front*c_front, where, a_front and c_front denote the opacity and color of the front picture respectively, and c_back denotes the color of the back picture. As those skilled in the art will appreciate, other schemes such as front to back or pre-multiplied alpha may be used with the respective formulas found in general computer graphics literature. The resulting image for VRT rendering is shown in FIG. 12.

Multi-Resolution Rendering

The time it takes to render an image depends on several criteria, such as the rendering mode, the resolution (i.e., number of pixels) of the rendered (target) image and the size of the input data set. For large data sets and high-resolution renditions, rendering can take up to several seconds, even on a fast GPU. However, when a user wants to interactively manipulate the data set, i.e., rotate it on the screen, multiple screen updates per second (typically 5-25 updates/second) are required to permit a smooth interaction. This means that the rendition of a single image must not take longer than few hundred milliseconds, ideally less than 100 milliseconds.

Figure 15:
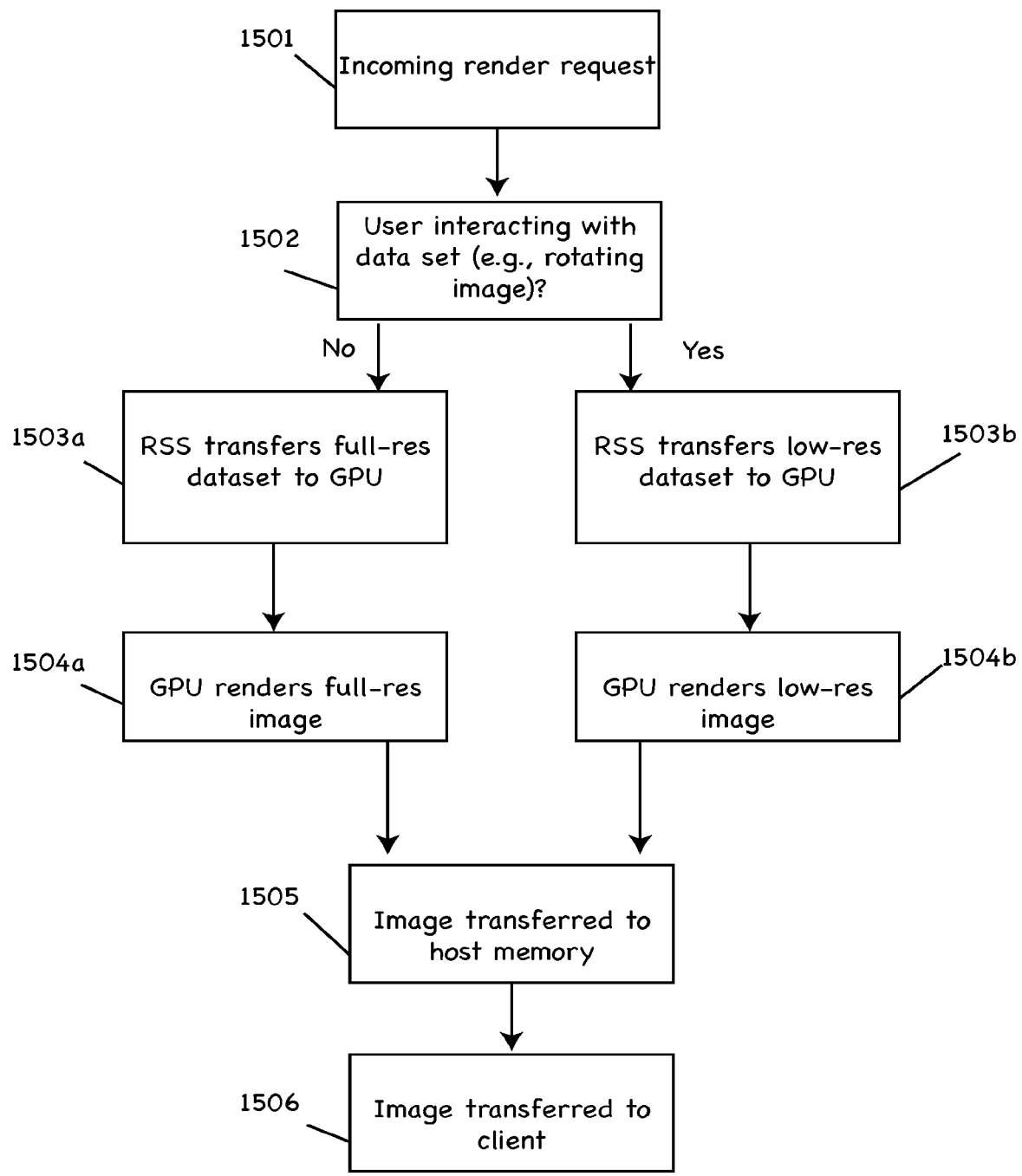
FIG. 15 is a flowchart illustrating a method of multi-resolution rendering in a system of the type shown in FIG. 1.

One way to ensure smooth rendering during users' interactive manipulations of data sets is by rendering images at a resolution according to the level of a user's interaction. One way to guarantee this is illustrated in FIG. 15. Here, by way of example, the system checks whether the user is rotating the data set (see, Step 1502). If so, the render server uses a lower resolution version of the input data and renders the images at a lower target resolution. See, steps 1503b and 1504b. Once the user stops interacting, e.g., by releasing the mouse button, a full resolution image is rendered with the full-resolution data set and the screen is updated with that image, potentially a few seconds later. See, steps 1503a and 1504a. Schemes with more than two resolutions can be used in the same way.

In the subsequent discussion we refer to the above scenario to illustrate certain aspects of the invention. We refer to the low-resolution renderings as "interactive render requests" and to the larger full resolution renditions as "high-resolution render requests". The methodologies described below are not restricted to an interaction scheme which uses two resolutions in the way described above.

Scheduling Strategies

In order to build an effective multi-user multi-GPU render server, another component of the Render Server Software is provided which dispatches, schedules and processes the render requests in a way that maximizes rendering efficiency. For example, the number of client computers which can access the render server concurrently may not be limited to the number of GPUs. That is, two or more clients might share one GPU. Render requests received by such clients therefore need to be scheduled. This section describes some factors that may be considered for the scheduling and illustrates why a trivial scheduling may not be sufficient in all cases.

Figure 3:
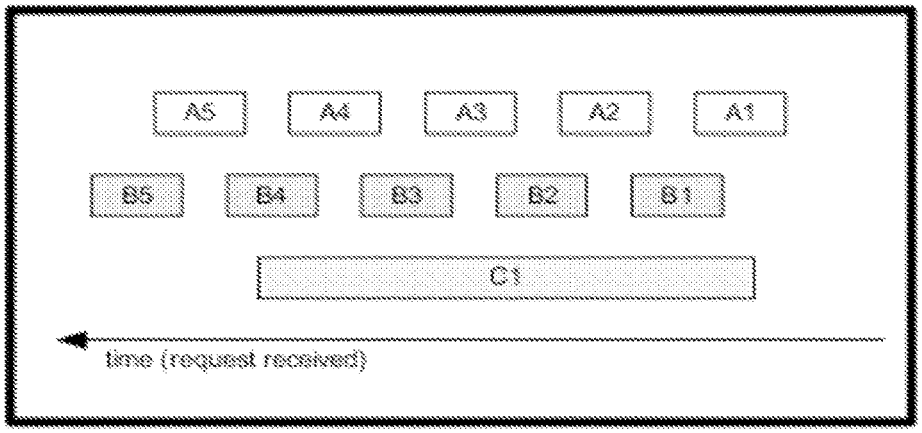
FIG. 3 depicts a timeline of incoming render requests from client computers in a system of the type shown in FIG. 1.

FIG. 3 illustrates, by way of non-limiting example, render requests coming in from three different client computers. The render requests A1, A2, . . . , A5 shall come in from a client computer A, while the render requests B1 . . . B5 come in from client computer B and the render request C1 comes from client computer C. The different sizes of the render requests in FIG. 3 symbolize the different size in the sense that larger boxes (such as C1) require more processing time and require more graphics memory than smaller ones (such as for example A1). The horizontal axis symbolizes the time axis, depicting when the render requests have been received, i.e., render request A1 has been received first, then C1, then B1, then A2, then B2, and so forth.

Figure 4:
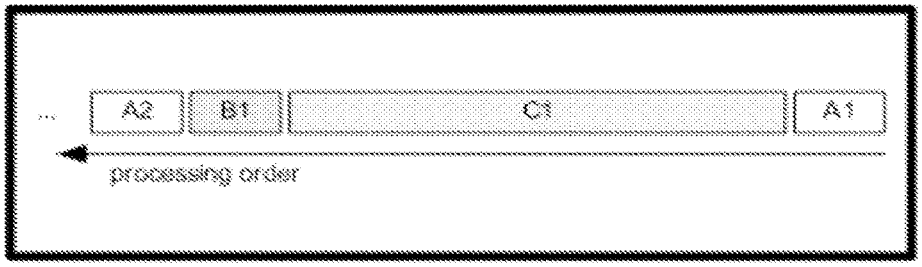
FIG. 4 depicts timelines for processing requests of the type shown in FIG. 3.

In one example, the "smaller" render requests A1 . . . A5 and B1 . . . B5 are interactive render requests, e.g., requests received While the user is rotating the data set, while C1 may be a high-resolution render request. By way of example, the interactive render requests might require 50 ms to process, while the high-resolution render request might take 2 seconds to render. If only one GPU was available to handle these render requests, and if the render requests were scheduled in a trivial way, on a first come-first serve basis, the result would not yield a good user experience. FIG. 4 illustrates such a case where request A1 is processed first, followed by C1, B1, A2, While render request C1 is processed, which in this example is assumed to take 5 seconds, no render requests for client A and client B would be processed. However this example assumes that the users using client A and client B are at this given time interactively manipulating, e.g., rotating, the data sets. Therefore if those clients would not receive a screen update for 2 seconds, the interaction would stall, prohibiting a smooth and interactive user experience.

An alternative strategy of not processing any high-resolution render requests as long as any interactive render requests are still pending also would not be optimal. If, in the above example, the users using clients A or B rotated their data sets for a longer period of time. e.g., half a minute or longer, then during that time they would constantly generate render requests, effectively prohibiting the request from client C to be processed at all (until both other users have completed their interaction). This is also not desired.

Methods of improved scheduling to reduce average wait time for a response to a client computer's render request are needed. We are now going to describe two alternative strategies for a better scheduling and will later describe how a combination of both leads to even better results.

Figure 5:
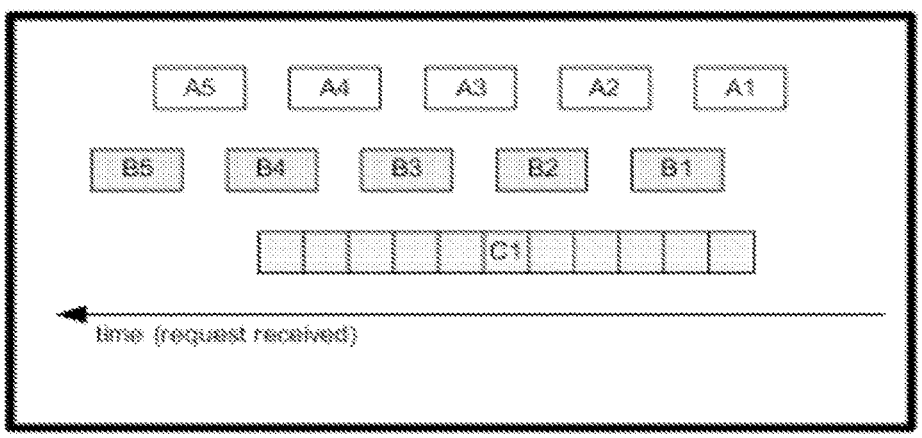
FIG. 5 depicts timelines for processing requests of the type shown in FIG. 3.
Figure 6:
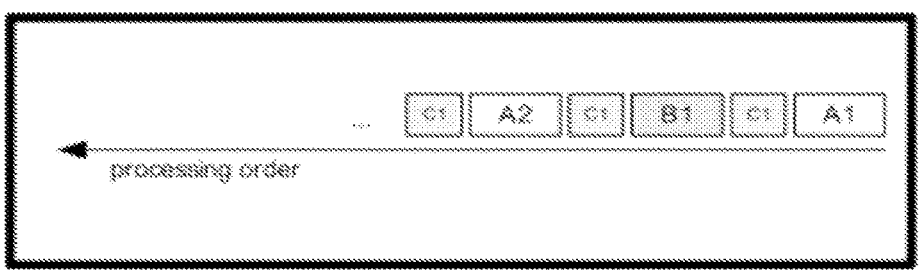
FIG. 6 depicts timelines for processing requests of the type shown in FIG. 3.

The first strategy, illustrated in FIG. 5 and FIG. 6, involves the situation where "large" render requests are broken down into multiple smaller render requests which are processed individually. For example, here, request C1 is broken down into multiple smaller requests. Once this is done, those smaller requests can be scheduled more flexibly, for example as shown in FIG. 6. Such a scheduling has the advantage that none of the clients would see any significant stalling—only a somewhat reduced rate of screen updates per second. Still however also the high-resolution render request would not be postponed indefinitely but be processed in a timely manner.

Concurrent Rendering

The second strategy is to issue multiple render commands to the same graphics board simultaneously, i.e., issue a first command (e.g., in response to a request received from a first client computer) and then issue a second command (e.g., in response to a request received from a second client computer) before the first request is completed. Preferably, this is done so as to interleave commands that correspond to different respective client requests so that the requests are processed in smaller time slices in an alternating fashion.

This can be done in multiple ways. One way is to use multiple processes or multiple threads, each rendering using the same graphics board. In this case the operating system and graphics driver respectively handle the "simultaneous" execution of the requests. In fact, of course, the execution is not really simultaneous but broken down into small time slices in which the requests are processed in an alternating fashion. The same can be achieved by a single thread or process issuing the primitive graphics commands forming the render requests in an alternating fashion, thereby assuring that texture bindings and render target assignments are also switched accordingly.

The reason why it may be advantageous to issue multiple render commands simultaneously in contrast to a fully sequential processing as depicted, e.g., in FIG. 6, is twofold. First, it can be the case that, even after breaking down larger render requests into smaller ones, each request may still take more processing time than one would like to accept for stalling other, smaller, interactive requests. Second, a graphics board is a complex sub-system with many different processing and data transfer units, some of which can work in parallel. Therefore, certain aspects of two or more render requests being processed simultaneously can be executed truly simultaneously, e.g., while one render request consumes the compute resources on the GPU, the other consumes data transfer resources. Thus, executing the two requests simultaneously may be faster than executing them sequentially. Additionally, although the GPU simultaneously processes render commands issued by the render server CPU on behalf of multiple remote client computers, the GPU may also simultaneously process render requests (or other requests) issued by or on behalf of other functionality (e.g., requests issued by the render server CPU on behalf of a local user operating the server computer directly).

Another aspect taken into account by the Render Server Software when issuing render requests simultaneously is the total graphics resource consumption. If the sum of required graphics memory for all simultaneously processed render requests would exceed the total graphics resources on the graphics board, then a significant performance decrease would be the consequence. The reason is, that whenever the operating system or graphics driver switched from execution of request 1 to request 2, then first the data required for the processing of request 1 would have to be swapped out from graphics memory to host memory to make room for the data needed for request 2. Then the data needed for the processing of request 2 would have to be swapped in from host memory into graphics memory. This would be very time consuming and inefficient.

Figure 17:
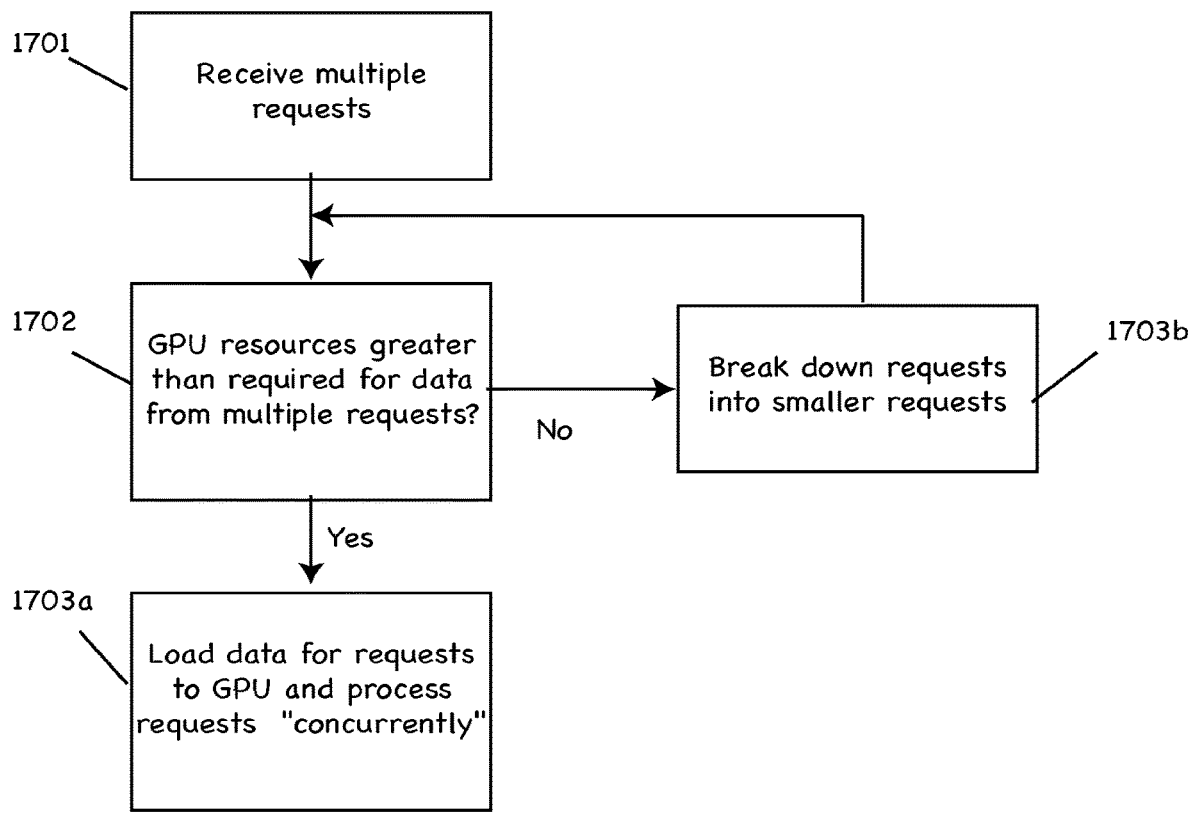
FIG. 17 is a flow chart illustrating a method of breaking down render requests into smaller requests in connection with concurrent rendering.

FIG. 17 illustrates how the method described above of breaking down render requests into smaller requests can be used with concurrent rendering. Specifically, when scheduling requests, the Render Server Software insures that requests are broken down sufficiently so that the total resource requirements for all simultaneously processed requests do fit into the totally available graphics memory of the graphics board processing these requests. See, steps 1702 and 1703*b*.

Persistent Data

Figure 16A:
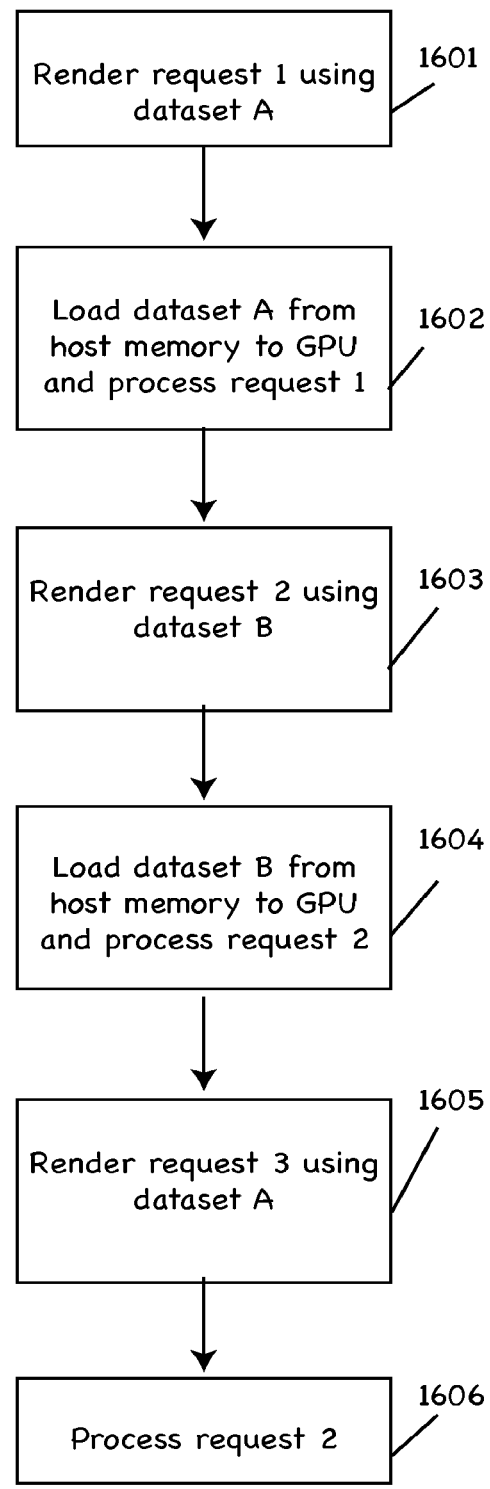
FIG. 16A is a flowchart illustrating data upload from host memory to graphics memory in a host system of the type shown in FIG. 2.

The Render Server Software additionally implements schemes to take advantage of data persistency, during scheduling and/or dispatching of requests. Very often subsequent render requests use some of the same data. For example if a user rotates a data set, then many different images will be generated all depicting the same input data set only rendered from different viewing angles. Therefore, if one request has been processed, it can be of advantage to not purge the input data from the graphics memory, but instead keep it persistent in anticipation of a future render request potentially requiring the same data. As illustrated in FIG. 16*a*, in this way a repeated data upload from host memory into graphics memory can be avoided. See, step 1606.

In single-GPU systems, a scheduler component of the Render Server Software may take data persistency into account and re-arrange the order of requests in such a way as to optimize the benefit drawn from persistency. In the case of FIG. 16*a*, for example, the scheduler might rearrange the order of the requests so that render request 3 is processed immediately subsequent to render request 1.

Figure 16B:
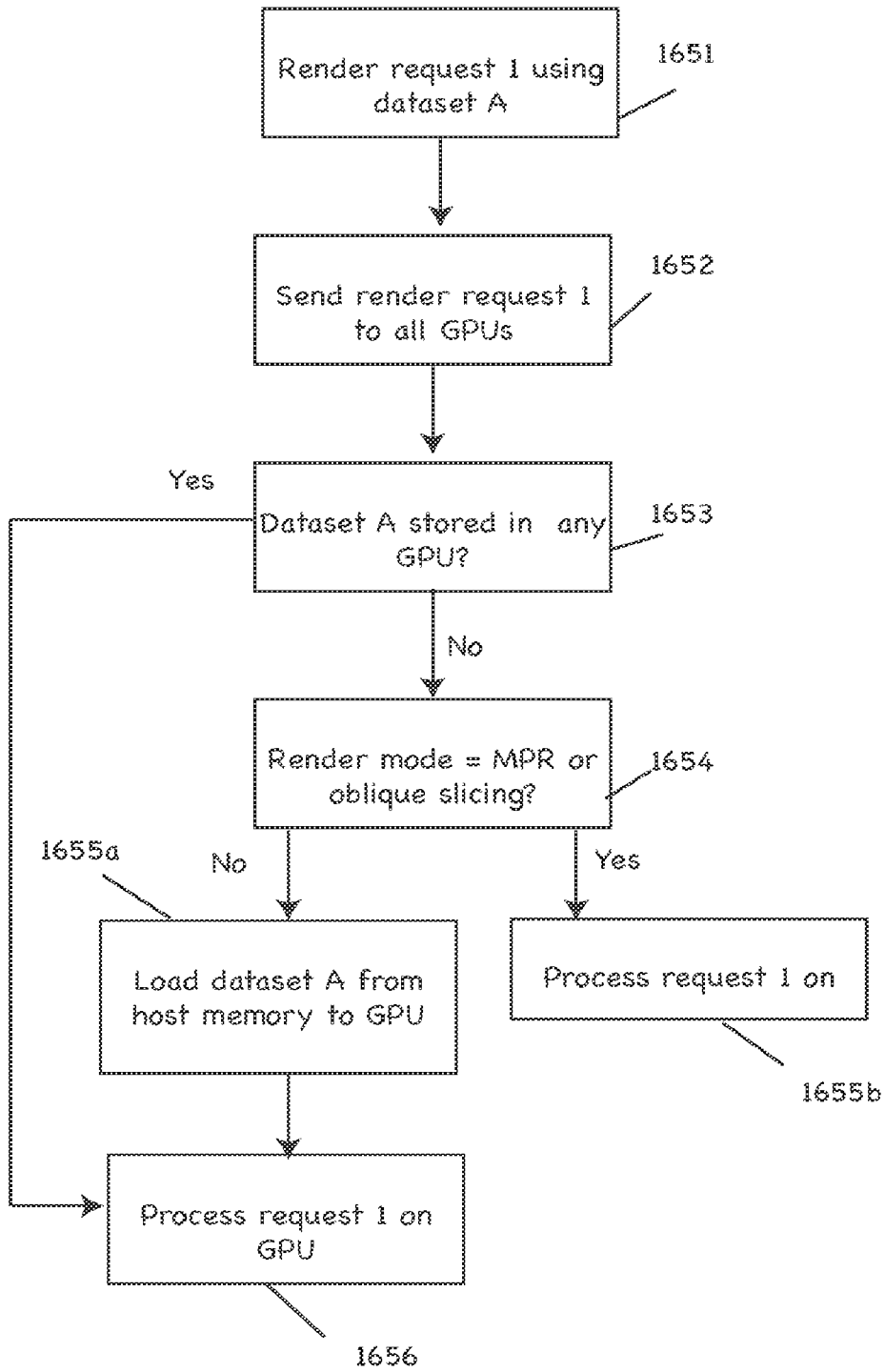
FIG. 16B is a flowchart illustrating data upload from host memory to graphics memory in a host system of the type shown in FIG. 2.

In a multi-GPU system, on the other hand, the dispatcher component of the Render Server Software takes persistency into account when deciding which GPU to use to satisfy a specific render request. For example, as mentioned above and depicted in FIG. 16*b*, render requests in multi-GPU systems are typically dispatched to all of the GPUs following the same basic scheme as described above. See, step 1652. To take advantage of data persistency, the dispatcher component attempts to dispatch the current request to a graphics processing unit in which the data set specified by the request is stored. See, steps 1653 and 1656. This will often lead to subsequent interactive render requests from the same client computer being handled by the same GPUs.

But, not all render requests need to be executed on the GPUs. Depending on resource use and the type of request, it may also be feasible to use one or more CPU cores on one or more CPUs to process a render request, or a combination of CPU and GPU. For example, rendering requests For MPR mode and oblique slicing can be executed on the CPU unless the data required is already on the GPU. See, steps 1654 and 1655*b*.

Rendering requests are only one example. As those skilled in the art will appreciate, the described embodiment can also be used in the same way to perform other data processing tasks, such as filtering, feature detection, segmentation, image registration and other tasks.

Described above are methods and systems meeting the desired objects, among others. It will be appreciated that the embodiments shown and described herein are merely examples of the invention and that other embodiments, incorporating changes therein may fall within the scope of the invention.

What is claimed is:

1. A method for rendering images comprising:
 a) executing on a server a render server program, where the server includes a server digital data processor, a graphics processing unit (GPU), a server memory and a graphics memory;
 b) receiving from a first client a first render request to render a first image at the server, where the first render request is broken down into a plurality of first time slices;
 c) receiving from a second client a second render request to render a second image at the server, where the second render request is broken down into a plurality of second time slices;
 d) the render serve program issuing commands comprising:
  a) generating a queue comprising the first render request and the second render request such that one or more of the plurality of first time slices and one or more of the plurality of second time slices are processed in an alternating fashion; and
  b) issuing commands to the GPU to process one or more of the plurality of first time slices and one or more of the plurality of second time slices in the alternating fashion to render one or both the first render request and the second render request based on the queue, where the GPU switches between processing at least one of the plurality of second time slices before the first render request is completed; and
 e) sending one or both the first image to the first client and the second image to the second client.

2. The method of claim 1, where in step b) the GPU processes the plurality of first time slices without swapping data out of the graphics memory into the server memory.

3. The method of claim 1, where in step b) the GPU processes one or more of the plurality of second time slices before the first render request is completed.

4. The method of claim 3, where in step b) the GPU processes the one or more of the plurality of second time slices without swapping data out of the graphics memory into the server memory.

5. The method of claim 1, where in step b) the GPU processes at least one of the plurality of second time slices before the first render request is completed.

6. The method of claim 5, where in step b) the GPU processes the plurality of second time slices without swapping data out of the graphics memory into the server memory.

7. The method of claim 1, where in step b) the GPU processes the plurality of first time slices without exceeding the graphics memory size.

8. The method of claim 1, where in step b) the GPU processes the plurality of second time slices without swapping data out of the graphics memory into the server memory.

9. The method of claim 1, where the sum of the GPU processing time to process the plurality of first time slices is less than the GPU processing time required to process the first render request.

10. The method of claim 1, where in step b) the GPU switches between processing the plurality of first time slices and one or more of the plurality of second time slices before the first render request is completed.

11. The method of claim 1, where in step b) the GPU switches between processing the plurality of first time slices without swapping data out of the graphics memory into the server memory.

12. A method for rendering images comprising:
- A) executing on a server a render server program, where the server includes a server digital data processor, a graphics processing unit (GPU), a server memory and a graphics memory;
- B) receiving from a first client a first render request to render a first image at the server;
- C) receiving from a second client a second render request to render a second image at the server;
- D) the render serve program issuing commands comprising:
  - a) a first single command to the GPU to process the first render request comprising one or more first texture bindings and one or more first render image assignments; and
  - b) a second single command to the GPU to process the second render request comprising one or more second texture bindings and one or more second render image assignments in an alternating fashion, where at least one of the one or more second texture bindings and/or at least one of the one or more second render image assignments are processed before the one or more first texture bindings and the one or more first render image assignments are processed such that the first render request and the second render request are rendered in the alternating fashion; and
- E) sending one or both the first image to the first client and the second image to the second client.

13. The method of claim 12, where the GPU processes the one or more first render image assignments without swapping data out of the graphics memory into the server memory.

14. The method of claim 12, where the GPU processes the one or more first texture bindings without swapping data out of the graphics memory into the server memory.

15. The method of claim 12, where the GPU processes the one or more second texture bindings without swapping data out of the graphics memory into the server memory.

16. The method of claim 12, where the GPU processes the one or more second render image assignments without swapping data out of the graphics memory into the server memory.

17. The method of claim 12, where the GPU switches between processing at least one of the one or more second texture bindings before a first render image assignment of the one or more first render image assignments is completed.

18. The method of claim 12, where the GPU switches between processing at least one of the one or more second render image assignments before the first render request is completed.

19. The method of claim 12, where the GPU switches between processing at least one of the one or more second texture bindings or the one or more second render image assignments before the first render request is completed.

* * * * *